(12) United States Patent
Nakamura

(10) Patent No.: US 8,344,044 B2
(45) Date of Patent: Jan. 1, 2013

(54) GLASS-CONTAINING RESIN MOLDED PRODUCT

(76) Inventor: Kenji Nakamura, Osaka (JP)

( * ) Notice: Subject to any disclaimer, the term of this patent is extended or adjusted under 35 U.S.C. 154(b) by 0 days.

(21) Appl. No.: 13/001,026

(22) PCT Filed: Aug. 7, 2009

(86) PCT No.: PCT/JP2009/063987
§ 371 (c)(1),
(2), (4) Date: Feb. 15, 2011

(87) PCT Pub. No.: WO2011/016127
PCT Pub. Date: Feb. 10, 2011

(65) Prior Publication Data
US 2012/0095126 A1    Apr. 19, 2012

(51) Int. Cl.
*C08K 3/40* (2006.01)
*C08K 13/02* (2006.01)

(52) U.S. Cl. ........ 523/122; 524/494; 428/403; 428/406; 428/407

(58) Field of Classification Search .................. 523/122; 524/494; 428/403, 406, 407
See application file for complete search history.

(56) References Cited

U.S. PATENT DOCUMENTS 8,007,907 B2 * 8/2011 Nakamura .................... 428/403
2010/0292067 A1 * 11/2010 Nakamura ...................... 501/32

FOREIGN PATENT DOCUMENTS

| JP | 08-299070 A | 11/1996 |
| JP | 10-166382 A | 6/1998 |
| JP | 11-021378 A | 1/1999 |
| JP | 2001-018271 A | 1/2001 |
| JP | 2001-088198 A | 4/2001 |
| JP | 2003-192918 A | 7/2003 |
| JP | 2005-066823 A | 3/2005 |
| JP | 2006-110905 A | 4/2006 |
| JP | 2007-022944 A | 2/2007 |
| JP | 2007-190878 A | 8/2007 |
| JP | 2009-018467 A | 1/2009 |
| WO | WO 2009/044884 A1 | 4/2009 |

OTHER PUBLICATIONS

Sigma Press, "Plastic Materials for Molding Processing", Edited by Polymer Process Society, Feb. 25, 2005, p. 108, line 3-11 under Fig. 32 and p. 109, line 13-16 under Fig. 3.3.
Koyo Arikata, "Anti-Failure Measures in Injection Molding Process", (2) Skin Layer and Fluidized Layer, Nikkan Kogyo Shinbun, Jul. 18, 2006, p. 10, line 1-6, under Fig. 1.9.
Koji Yamada et al., Structural Evaluation of Injection Moldings by Laser-Raman Spectroscopy, Science and Industry vol. 81, No. 9, Sep. 2007, pp. 433-438. (Englishi abstract only).

* cited by examiner

*Primary Examiner* — Kriellion Sanders
(74) *Attorney, Agent, or Firm* — Knobbe, Martens Olson & Bear LLP

(57) ABSTRACT

Provide an agent-to-be-filled/glass-containing resin molded product having no skin layer formed on its surface and free of sink marks, warping and other forms of deformation and also allowing an agent-to-be-filled blended in it to sufficiently effectuate, with a low blending ratio, action equivalent to when the agent-to-be-filled is blended at a traditional blending ratio; wherein the agent-to-be-filled/glass-containing resin molded product is characterized in that it is made of one type of resin selected from the group that includes polyethylene resin, polypropylene resin, polyethylene terephthalate resin and polyamide resin, that it contains solid, spherical glass beads with an average particle size of 10 to 40 μm, and when the glass blending ratio of these solid, spherical glass beads is 40 to 70 percent by weight, no skin layer is formed on the surface of such glass-containing resin molded product as measured by laser Raman spectroscopy, and presence of the aforementioned solid, spherical glass beads and agent-to-be-filled on its surface allows the agent-to-be-filled to effectuate its action.

11 Claims, 7 Drawing Sheets

US 8,344,044 B2

GLASS-CONTAINING RESIN MOLDED PRODUCT

This application is the U.S. National Phase under 35 U.S.C. §371 of International Application PCT/JP2009/063987, filed Aug. 7, 2009. The International Application will be published under PCT Article 21(2) in a language other than English.

TECHNICAL FIELD

The present invention relates to an agent-to-be-filled/glass-containing resin molded product having no skin layer formed on it because molten thermoplastic resin containing spherical glass and an agent-to-be-filled is molded with its surface in contact with the die walls of an injection molding apparatus, etc., thereby being free of sink marks, warping or other forms of deformation and being capable of sufficiently demonstrating the action of the agent-to-be-filled.

PRIOR ART

In the manufacturing of a resin molded product by molding resin pellets using a molding machine, it is a well-known fact that injecting molten resin into the cavity causes the molten resin to be cooled rapidly on the walls of the dies constituting the cavity and a layer of solidified resin (hereinafter referred to as "skin layer") is formed on the walls. To be specific, a skin layer is inevitably formed on the surface of molten resin in areas where it contacts with the surfaces of injection molding dies, blow molding dies or profile extrusion molding dies. When a skin layer is formed, the resin molded product suffers problems such as sink marks, warping and other forms of deformation. If any agent-to-be-filled such as a silver antibacterial agent is blended into the resin, the skin layer covers the silver antibacterial agent and thus prevents silver ions from bleeding out to the surface of the resin molded product, which presents a problem of the agent-to-be-filled being unable to effectuate its inherent action.

A number of proposals have been reported that attempt to solve the aforementioned problems of sink marks, warping and other forms of deformation suffered by resin molded products, as well as the problem of agents-to-be-filled unable to effectuate their inherent actions.

Proposals that attempt to solve the problem of deformation include the patent literature cited below.

Under the hollow injection molding method for forming polyacetal resin molded products, a hollow section is formed by injecting a compressed liquid into resin during or after injection of resin. Because the pressure of gas injected into the hollow section is held for a specified period of time until all resin in the cavity is cooled, molding dimensions can be adjusted easily by adjusting the pressure of this compressed gas being injected as well as the pressure holding time of the compressed liquid. A polyacetal resin molded product obtained by this hollow injection molding method has a skin layer of not more than 150 µm in maximum thickness in the surface layer on the exterior surface of the molded product, but no skin layer is present in the surface layer on the interior surface of the molded product (refer to Patent Literature 1).

Under the conventional injection molding method, there is often a large difference between the resin pressure on gate side Pgr and resin pressure on counter-gate side Por, especially when elastomer or other resin having high elasticity is used or a long molded product is formed, and the resulting non-uniformity of resin pressure generates weight variation or distortion in the molded product, leading to a skin layer defect due to density difference that prevents a quality molded product from being achieved. An injection molding method has been proposed to address this problem, wherein a pressure holding step is used to add a holding pressure Pc to resin L injected and filled into a die cavity C, where a target holding pressure Ps in this pressure holding step is set beforehand and once the molding process moves to the pressure holding step, the holding pressure Pc is added based on the target holding pressure Ps, and at the same time the resin pressure on gate side Pg and resin pressure on counter-gate side Po are detected in the die cavity C so that when the resin pressure on counter-gate side Po starts dropping, pressure control is applied to align the resin pressure on gate side Pg with the resin pressure on counter-gate side Po (refer to Patent Literature 2).

Another injection molding method has been proposed to prevent lines, sink marks, warping and other defects on the exterior surface of the molded product by injecting and filling resin while dies are hot, wherein after clamping injection is started in the injection/filling step after confirming that the temperature in the die cavity is equal to or above the heat deformation temperature (HDT) of the thermoplastic resin to be filled, and the injection/filling step is ended after detecting and confirming that the injection screw has reached the set filling completion position and the die cavity temperature has reached the specified level, after which the pressure holding step is started and ended according to the set pressure holding time and/or set die cavity temperature (refer to Patent Literature 3).

Furthermore, injection molding dies have been proposed for the purpose of providing injection molding dies offering excellent transferability and durability and which are capable of reducing residual strain and warping, wherein such injection molding dies comprise fixed and moving dies that together form a cavity and these fixed and moving dies have a nest and this nest forms at least one part of the aforementioned cavity, where the aforementioned nest is constituted by a metal plate, heat-insulating ceramic material and metal nest body, arranged in this order, from the cavity side to the counter-cavity side, while the aforementioned metal plate and ceramic material, and the aforementioned ceramic material and nest body, are joined by diffusion bonding with an insert material inserted between the respective members (refer to Patent Literature 4).

The profile extrusion molding apparatus described in Patent Literature 5 prevents generation of residual stress and distortion in rain gutters, sashes, deck materials and other profile extrusion molded products. When resin is passed through an insertion hole provided at the introduction part of the cooling bath of the forming apparatus (generally referred to as "molding machine") for the purpose of forced cooling, residual stress generates in the profile extrusion molded product because all parts of the profile extrusion molded product are not cooled uniformly, and consequently this residual stress generates distortion later on. Since the aforementioned profile extrusion molding apparatus is designed to let refrigerant in the refrigerant channel bore flow into the insertion hole via the slit in the flow-rate adjustment pipe, turning this flow-rate adjustment pipe allows for adjustment of the flow rate of refrigerant flowing into the insertion hole via the slit in the flow-rate adjustment pipe. This way, a long molded product, especially areas subject to non-uniform cooling, can be cooled uniformly and therefore generation of residual stress, and consequently distortion, can be prevented (refer to Patent Literature 5).

The hollow molding dies described in Patent Literature 6 aim to provide a gas injection pin capable of directly supplying and injecting gas through the tip of the gas injection pin designed for easy injection of gas, in order to solve the problem of the viscosity of molten resin increasing gradually in the die cavity from the areas contacting the die cavity and thereby causing a skin layer to form, which required a high gas pressure to break the thick skin layer contacting the dies, resulting in warping/deformation of the resin molded product, as well as the problem of injected gas flowing into so-called partings, or spaces between the dies and skin layer, thereby creating gas flow marks on the surface of the molded product that will become molding defects.

It should be noted that the following known prior art literature refers to the mechanism of how the aforementioned skin layer is formed and to the method for measuring this skin layer.

One theory is that when molten thermoplastic resin at a temperature of well over 200° C. is injected into the cavity (die temperature 40 to 70° C.), molten resin creates a fountain flow from the center of the tip of flow and the part contacting the wall surface of the cavity cools immediately and solidifies to form a skin layer (refer to Non-patent Literature 1). Another theory is that molten resin flowing inside the cavity on the inner side of the skin layer forms a shear layer on the inner side of the skin layer due to the shear force acting between the skin layer and molten resin. To be specific, in the case of a crystalline polymer a trans-crystal layer of fine crystalline structure is formed on the inner side of the skin layer due to an inductive shear flow, and the aforementioned shear layer is formed on the inner side of this trans-crystal layer, meaning that three layers of skin layer, trans-crystal layer and shear layer are formed (refer to Non-patent Literature 2).

A method for measuring the aforementioned skin layer has been reported in the form of a research paper presenting the results of measurement using laser Raman spectroscopy. This research paper examined whether or not laser Raman spectroscopy could be applied to analysis of the molecular orientation of injection molded products, where molecular orientation measurement was performed on polystyrene resin and an oriented layer was measured only within a thickness of 100 to 200 μm from the surface along counterflow weld lines and consequently laser Raman spectroscopy was judged effective for molecular orientation analysis (refer to Non-patent Literature 3).

The following patent literature can be cited that propose to solve the problem of agents-to-be-filled unable to sufficiently effectuate their inherent actions.

An antibacterial/antifungal plastic molded product has been proposed, wherein an antibacterial/antifungal plastic molded product that contains an antibacterial/antifungal agent constituted by inorganic fine particles being covered by a skin layer is injected with the aforementioned antibacterial/antifungal agent by means of blast pressure, so that the skin layer covering the antibacterial/antifungal agent is separated from the inorganic fine particles near the surface of the plastic molded product, thereby exposing the fine particles of the antibacterial/antifungal agent to effectuate their antibacterial/antifungal action (refer to Patent Literature 7).

In addition, kitchen furniture has been proposed, wherein the surface of a resin molded product, be it a thermoplastic resin, thermosetting resin or any other resin mixed with antibacterial particles, is roughened by sand blasting, brush abrasion, belt abrasion, etc., to remove the skin layer covering the surface of the resin molded product and thereby allowing the heads of antibacterial particles to be exposed across the surface, so that silver ions no longer need to travel through the skin layer on resin but can directly effectuate their antibacterial action on the surface of such resin molded product constituting the furniture (refer to Patent Literature 8).

As molten resin is filled into the cavity and a skin layer is formed on the surface, flow marks, jetting marks and other visible molding defects occur, especially at the tip of molten resin flow subject to a fountain flow that leads to transfer problems and promotes solidification of resin. Accordingly, a thermoplastic resin molded product has been proposed, which is characterized in that immediately after resin is filled into the cavity, the space between the formed skin layer and cavity surface contacting the skin layer can be injected with carbon dioxide, an antistatic agent or other substance that dissolves into the resin surface to push back the skin layer by a trace amount and temporarily stop the growth of skin layer so that the carbon dioxide/antistatic agent can permeate into the skin layer while the growth of skin layer is stopped, after which the resin pressure is raised again to cause the skin layer, now permeated with the carbon dioxide/antistatic agent, to contact the cavity surface, which is then followed by pressure retention and cooling to form a thermoplastic resin molded product. This thermoplastic resin molded product allows a carbon dioxide or antistatic agent to be injected uniformly between the die cavity and skin layer and is described as having a good appearance free of transfer problems, uneven transfer, etc., regardless of the shape of the product (refer to Patent Literature 9).

On the other hand, an antibacterial resin composition has been proposed to address the problem of the antibacterial agent unable to achieve sufficient antibacterial property because the skin layer prevents the antibacterial agent from bleeding out to the surface, wherein such resin composition is constituted by 100 parts by weight of a resin component, 0.1 to 30 parts by weight of a metal antibacterial agent containing metal supported on fibrous materials, and 0.1 to 30 parts by weight of a hydrophilic component. In the example, the aforementioned resin component is an acrylonitrile-styrene copolymer, the metal antibacterial agent containing metal supported on fibrous materials is a metal antibacterial agent containing silver supported on potassium titanate fibers, and the hydrophilic component is a polyethylene oxide/polyether/polyamide block copolymer, where the absorption coefficient of this resin is 4.5 percent and approx. 70 percent by weight when soaked in water (at 23° C. for 24 hours), and a molded product formed using the aforementioned resin composition has channels in the resin intentionally formed to pass water molecules, etc., so that the antibacterial component can bleed out easily to the surface of product and consequently the antibacterial performance is improved (refer to Patent Literature 10).

Patent Literature 1: Japanese Patent Laid-open No. Hei 10-166382
Patent Literature 2: Japanese Patent Laid-open No. 2001-18271
Patent Literature 3: Japanese Patent Laid-open No. 2006-110905
Patent Literature 4: Japanese Patent Laid-open No. 2009-18467
Patent Literature 5: Japanese Patent Laid-open No. 2001-88198
Patent Literature 6: Japanese Patent Laid-open No. 2005-66823
Patent Literature 7: Japanese Patent Laid-open No. 2007-22944
Patent Literature 8: Japanese Patent Laid-open No. Hei 8-299070
Patent Literature 9: Japanese Patent Laid-open No. 2007-190878

Patent Literature 10: Japanese Patent Laid-open No. Hei 11-21378

Non-patent Literature 1: "Shashutsu Seikei Kako no Furyo Taisaku (Countermeasures to Injection Molding Defects)," Nikkan Kogyo Shimbun, pp. 10-11, issued on Jul. 18, 2008 (Initial Edition, 6th Print)

Non-patent Literature 2: "Seikei Kako ni Okeru Plastic Zairyo—Plastic Seikei Kako III (Plastic Molding Materials—Plastic Molding III)," Sigma Shuppan, pp. 107-109, issued on Feb. 25, 2005 (Initial Edition, 2nd Print)

Non-patent Literature 3: "Kagaku to Kogyo (Chemistry and Chemical Industry)," Research Paper; Structural Evaluation of Injection Molded Products by Laser Raman Spectroscopy, 81 (9), pp. 433-438 (2007)

OVERVIEW OF THE INVENTION

Problems to be Solved by the Invention

The polyacetal resin molded product described in Patent Literature 1 is limited to the hollow injection molding method and the maximum thickness of skin layer must be reduced to no more than 150 μm by adjusting the pressure of compressed gas injected into the cavity as well as the pressure holding time of compressed liquid. Setting the aforementioned adjustment conditions to achieve a thickness at or below this target value is difficult and even if the various conditions could be set, controlling the necessary parameters according to these conditions is difficult.

The injection molding method described in Patent Literature 2 cannot achieve the desired dimensional accuracy of the molded product unless the transition of steps is time-managed and holding pressure and resin pressure are controlled strictly, but implementing such time management and pressure control is difficult.

The injection molding method described in Patent Literature 3 cannot achieve the desired dimensional accuracy of the molded product unless temperature detection, management of each step and holding pressure/temperature management are performed strictly, but implementing such temperature detection, management of each step and holding pressure/temperature management is difficult.

The injection molding dies described in Patent Literature 4 form a cavity with fixed and moving dies, while the nest is constituted by a ceramic material and metal nest body arranged in this order and these members are diffusion bonded to each other via an insert material inserted in between. Since these injection molding dies require the nest-type fixed and molding dies to be bonded via diffusion bonding, the die structure is complex and requires high precision, but fabricating such complex high-precision dies requires a lot of money and other burdens such as fabrication man-hours.

A conventional profile extrusion molding apparatus comprises an extrusion machine, dies, a molding machine having a cooling layer, a take-up machine and a cutting machine. The extrusion molding apparatus described in Patent Literature 5 allows for uniform cooling of areas subject to non-uniform cooling by turning the flow-rate adjustment pipe of the molding machine (forming apparatus), but fabricating such apparatus by modifying a conventional profile extrusion molding apparatus requires a lot of money and other burdens such as fabrication man-hours. The hollow molding dies described in Patent Literature 6 are characterized by a new gas injection pin installed on the hollow molding dies, instead of the traditional gas injection pin, to prevent formation of skin layer on the surface of the resin molded product, where fabrication of such new gas injection pin requires a lot of money and other burdens such as fabrication man-hours.

As explained above, the inventions described in Patent Literatures 1 to 6 above are aimed at minimizing sink marks, warping and other forms of deformation through the use of the aforementioned injection molding apparatus, injection molding dies, extrusion molding apparatus or hollow molding dies based on the assumption that formation of a skin layer results in generation of sink marks, warping and other forms of deformation in the resin molded product, and they require specific controls for each molded product to be manufactured, the fabrication of complex dies, etc., which in turn require a lot of money and other burdens such as fabrication man-hours.

The technical items described in Non-patent Literatures 1 to 3 above do not clearly specify the mechanism of how a skin layer is formed on thermoplastic resins, but they indicate that a skin layer is formed on crystalline polymers and this skin layer exists at a depth of 100 to 200 μm from the surface, and that laser Raman spectroscopy is effective in molecular orientation analysis.

The antibacterial/antifungal plastic molded product described in Patent Literature 7 solves the problem of skin layer by injecting the antibacterial/antifungal agent present on the surface of molded product by means of blast pressure. The kitchen furniture described in Patent Literature 8 solves the problem of skin layer by roughening the surface of such kitchen furniture by sand blasting or other roughening means. However, these solutions require a further step to separate or roughen the skin after the molded product has been formed, and therefore a lot of money and time, etc., is needed to manufacture the molded product. Also, Non-patent Literature 3 indicates that a skin layer exists over a thickness of 100 to 200 μm from the surface, which means that separating or roughening the surface of the molded product only permits action of an antibacterial agent present in the skin layer over a thickness of 0 to several microns, and an antibacterial agent present deeper than several microns cannot effectively effectuate its bacterial elimination action.

The thermoplastic resin molded product described in Patent Literature 9 has carbon dioxide that dissolves into the resin surface injected between the skin layer and cavity surface to push back the skin layer by a trace amount in order to prevent generation of visible molding defects such as flow marks, and for this reason a fluid injection unit and high-pressure fluid generating apparatus are provided in the injection molding apparatus, which leads to significant manufacturing cost and time, etc. In addition, while generation of visible molding defects such as flow marks can be prevented, a skin layer is still likely formed and whether antistatic action can be effectuated sufficiently is not clear.

The antibacterial resin composition described in Patent Literature 10 uses an acrylonitrile-styrene copolymer as the resin component instead of polymerizing monomers of general-purpose resins, while the metal antibacterial agent containing metal supported on fibrous materials is a metal antibacterial agent containing silver on potassium titanate fibers instead of a normally used silver antibacterial agent. These materials are expensive and add to the cost of the molded product. Furthermore, these materials must be blended with the hydrophilic component for the purpose of molding, which results in significant cost and time needed to manufacture the molded product.

The inventions described in Patent Literatures 7 to 10 above assume that a skin layer is formed on the surface of the molded product and attempt to let the antibacterial agent present inside this skin layer effectuate its antibacterial action, but to this end the skin layer must be processed and the molded product also processed to allow the antibacterial agent to effectuate its antibacterial action, and since this requires an additional processing step or steps, significant manufacturing burdens become necessary in terms of cost and time.

Examples using an antibacterial agent or antistatic agent as the agent-to-be-filled were explained. As for molding methods where molten resin is molded in contact with die wall surfaces, injection molding, blow molding and profile extrusion molding are known, where molded products manufactured by these molding methods contain one or more of components selected from a group that includes combinations of an antibacterial agent, flame retardant and antistatic agent according to the use of each molded product. For example, toilet seats, lids and body casings that are exposed components of toilet seat systems use a resin composition containing an antibacterial agent and flame retardant to add antibacterial property and flame retardant property (refer to Japanese Patent Laid-open No. 2001-61706, for example).

In light of the problems of the aforementioned prior arts, therefore, it is the object of the present invention to provide an agent-to-be-filled/glass-containing resin molded product having no skin layer formed on the surface of the resin molded product made by molding a general-purpose resin using a conventional molding method, thereby being free of sink marks, warping and other forms of deformation and also allowing the agent-to-be-filled to effectuate, with a small blending ratio, sufficient action equivalent to the action of the same agent-to-be-filled blended by a conventionally used ratio.

Means for Solving the Problems

The inventor of the present invention, after repeated examinations in earnest to solve the aforementioned problems, found that while a skin layer is formed on the surface of a glass-containing resin molded product containing solid, spherical glass beads by less than 40 percent by weight, no skin layer is formed on the surface of a glass-containing resin molded product if the aforementioned blending ratio is adjusted to a range of 40 to 70 percent by weight, and that presence of such spherical glass and agent-to-be-filled on the surface allows the agent-to-be-filled to effectuate its action, and eventually completed the present invention.

In other words, the present invention aimed at solving the aforementioned problems is described as follows:

The agent-to-be-filled/glass-containing resin molded product pertaining to Embodiment 1 is an agent-to-be-filled/glass-containing resin molded product formed by molding an agent-to-be-filled/glass-containing resin composition produced by melting and kneading thermoplastic resin pellets, spherical glass, and an agent-to-be-filled; wherein such an agent-to-be-filled/glass-containing resin molded product is characterized in that the thermoplastic resin is one type of resin selected from the group that includes polyethylene resin, polypropylene resin, polyethylene terephthalate resin and polyamide resin, the solid, spherical glass has an average particle size of 10 to 40 μm, and when the glass blending ratio of the solid, spherical glass is in a range of 40 to 70 percent by weight, no skin layer is formed on the surface of such glass-containing resin molded product as measured by laser Raman spectroscopy, and presence of the solid, spherical glass and an agent-to-be-filled on its surface allows the agent-to-be-filled to effectuate its action.

The agent-to-be-filled/glass-containing resin molded product pertaining to Embodiment 2 is characterized in that the agent-to-be-filled contains one or more of components selected from the group that includes combinations of an antibacterial agent, flame retardant and antistatic agent.

The agent-to-be-filled/glass-containing resin molded product pertaining to Embodiment 3 is characterized in that the surface of such glass-containing resin molded product has a depth in a range of 0 to at least 150 μm from the front side.

The agent-to-be-filled/glass-containing resin molded product pertaining to Embodiment 4 is characterized in that an equivalent action of the agent-to-be-filled can be achieved even when the blending ratio of the agent-to-be-filled therein relative to the total weight is at least one-fifth the blending ratio of the agent-to-be-filled blended in a 100% resin relative to the total weight.

The agent-to-be-filled/glass-containing resin molded product pertaining to Embodiment 5 is characterized in that the spherical glass is made of E glass or silica glass.

The agent-to-be-filled/glass-containing resin molded product pertaining to Embodiment 6 is characterized in that the front side of such glass-containing resin molded product has a number of distributed convex shapes.

The agent-to-be-filled/glass-containing resin molded product pertaining to Embodiment 7 is characterized in that the molding is implemented in the form of injection molding, blow molding or profile extrusion molding.

The agent-to-be-filled/glass-containing resin molded product pertaining to Embodiment 8 is characterized in that such glass-containing resin molded product is used for cosmetic containers, cosmetic implements, chemical containers, food containers, tableware, trays, tiles, bathtubs, kitchen/bath products, toiletry, automobile parts, electronic parts or construction materials.

The agent-to-be-filled/glass-containing resin molded product pertaining to Embodiment 9 is an agent-to-be-filled/glass-containing resin molded product formed by molding an agent-to-be-filled/glass-containing resin composition produced by melting and kneading thermoplastic resin pellets, spherical glass and an agent-to-be-filled; wherein such an agent-to-be-filled/glass-containing resin molded product is characterized in that the thermoplastic resin is one type of resin selected from the group that includes polyethylene resin, polypropylene resin, polyethylene terephthalate resin and polyamide resin, the solid, spherical glass is made of E glass or silica glass having an average particle size of 10 to 40 and no skin layer is formed on the surface of such glass-containing resin molded product and presence of the solid, spherical glass and agent-to-be-filled on its surface allows the agent-to-be-filled to effectuate its action.

The agent-to-be-filled/glass-containing resin molded product pertaining to Embodiment 10 is characterized in that the agent-to-be-filled contains one or more of components selected from the group that includes combinations of a silver antibacterial agent, flame retardant and antistatic agent.

The agent-to-be-filled/glass-containing resin molded product pertaining to Embodiment 11 is characterized in that the surface of such glass-containing resin molded product has a depth in a range of 0 to at least 150 μm from the front side.

The agent-to-be-filled/glass-containing resin molded product pertaining to Embodiment 12 is characterized in that an equivalent action of the agent-to-be-filled can be achieved even when the blending ratio of the agent-to-be-filled therein relative to the total weight is at least one-fifth the blending ratio of the agent-to-be-filled blended in a 100% resin relative to the total weight.

The agent-to-be-filled/glass-containing resin molded product pertaining to Embodiment 13 is characterized in that the front side of such glass-containing resin molded product has a number of distributed convex shapes.

The agent-to-be-filled/glass-containing resin molded product pertaining to Embodiment 14 is characterized in that no sink marks, warping and flow marks are generated on the surface of such glass-containing resin molded product.

The agent-to-be-filled/glass-containing resin molded product pertaining to Embodiment 15 is characterized in that molding is implemented in the form of injection molding, blow molding or profile extrusion molding.

The agent-to-be-filled/glass-containing resin molded product pertaining to Embodiment 16 is characterized in that such glass-containing resin molded product is used for cosmetic containers, cosmetic implements, chemical containers, food containers, tableware, trays, tiles, bathtubs, kitchen/bath products, toiletry, automobile parts, electronic parts or construction materials.

Effects of the Invention

In the field of resin molding technology, it has been a matter of fact that a skin layer is formed on the surface of resin molded products. In this sense, the agent-to-be-filled/glass-containing resin molded product proposed by the present invention is an innovative creation that demolishes this matter of technical commonsense in that, by the benefit of non-formation of skin layer, it can be utilized in various different fields such as containers, automobile parts, electronic parts and construction materials, to name a few.

To be specific, a molded product can be produced without allowing a skin layer to form as molten resin is molded in contact with dies, so long as the blending ratio of solid, spherical glass contained in the molded product is in a range of 40 to 70 percent by weight, and the molded product thus produced is free of sink marks, warping, flow marks or any other form of deformation on its surface, and in conclusion the present invention allows for production of a molded product offering good quality in terms of dimensional accuracy, etc., by using traditional dies and molding methods, which in turn eliminates the needs to fabricate complex, high-precision dies for each molded product or to strictly control the flow rate, temperature and other conditions of molten resin, and these benefits eventually lead to significant reduction in production cost and time.

The solution to the traditional problem of difficulty achieving the action of an agent-to-be-filled used, due to the aforementioned skin layer, is to blend spherical glass and an agent-to-be-filled by a blending ratio of 40 to 70 percent by weight into a general-purpose resin and knead the mixture together to perform molding, because by doing so the presence of the spherical glass and agent-to-be-filled at the surface of the molded product allows the agent-to-be-filled to sufficiently effectuate its action at a blending ratio of the agent-to-be-filled substantially lower than what is traditionally required when blending the same agent-to-be-filled in a 100% thermoplastic resin. This not only leads to substantial savings on material cost, but also saves the manufacturing cost of the agent-to-be-filled/glass-containing resin molded product.

The present invention can also be applied to all agents-to-be-filled whose particle size is smaller than that of the spherical glass used in the aforementioned agent-to-be-filled/glass-containing resin molded product, or specifically fillers in a size range of several microns to submicron, and therefore various excellent actions such as antibacterial, flame retarding and antistatic can be added to the molded product.

The agent-to-be-filled/glass-containing resin molded product proposed by the present invention can reduce the use of thermoplastic resin by 40 to 70 percent and thus contributes significantly to the effective utilization of petroleum resources, and since the melting point of thermoplastic resin is approx. 300° C. while the melting point of spherical glass is 1000° C. or above, such molded product can be incinerated with lower incineration heat, which not only reduces the burdens on incinerators but also reduces the amount of thermoplastic resin to be burned to as little as 30 percent, meaning that carbon dioxide emissions currently generated by burning of 100% resin molded products can be reduced by as much as 70 percent and consequently the present technology can contribute significantly to solving global warming.

Furthermore, by recovering and burning a maximum of 70 percent by weight of this agent-to-be-filled/glass-containing resin molded product containing spherical glass and an agent-to-be-filled, 70 percent by weight of spherical glass can be recovered and reused as a material for glass-containing molding pellets as many times as desired.

BEST MODE FOR CARRYING OUT THE INVENTION

The following first explains the manufacturing method of glass-containing molding pellets involving blending of a general-purpose thermoplastic resin used in large quantities in injection molded products, etc., such as polyethylene resin (hereinafter referred to as "PE"), polypropylene resin (hereinafter referred to as "PP"), polyethylene terephthalate resin (hereinafter referred to as "PET") or polyamide resin (hereinafter referred to as "Ny"), with spherical glass. Next, the skin layers of injection molded products made of 100% resins of PE, PP, PET and Ny, all of which are crystalline polymers, those made of PP, and of LDPE (low-density polyethylene resin) being a crystalline polymer with low crystallinity, are measured using laser Raman spectroscopy and shown is how a skin layer is formed on the surface of 100% resin molded products, but not when the blending ratio of spherical glass is 40 percent by weight or more.

Figure 4:
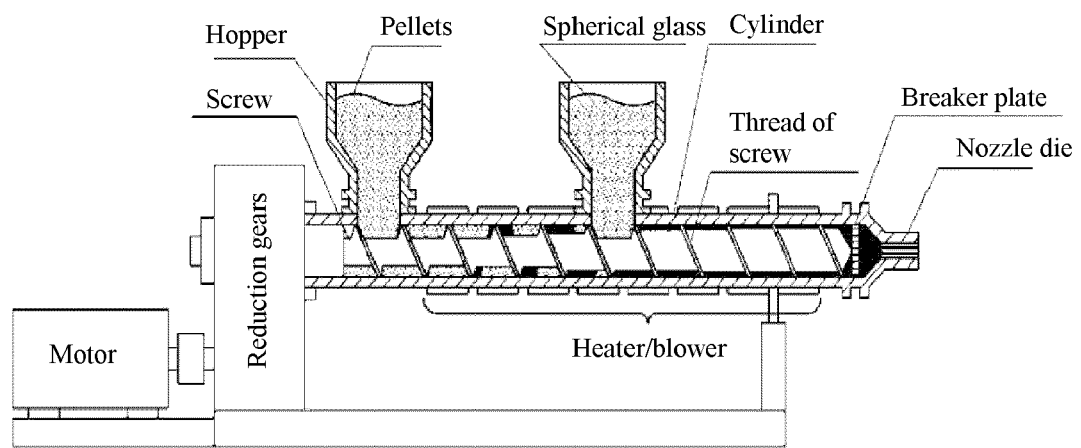
[FIG. 4] A longitudinal section view of an example of an extrusion machine used under a pellet manufacturing method where PP glass-containing molding pellets are formed.

The material used for molding an agent-to-be-filled/glass-containing resin molded product conforming to the present invention is an agent-to-be-filled/glass-containing resin composition and not glass-containing molding pellets, but for the apparatus of manufacturing these glass-containing molding pellets an extrusion machine equipped with two hoppers as shown in FIG. 4 is used, and the agent-to-be-filled/glass-containing resin composition is also manufactured using this extrusion machine. The aforementioned glass-containing molding pellets are manufactured by introducing resin pellets into the first hopper on the left side in FIG. 4 and spherical glass into the second hopper on the right, and the agent-to-be-filled/glass-containing resin composition is manufactured virtually in the same manner except that an agent-to-be-filled is introduced into the second hopper on the right in addition to spherical glass, and therefore how the aforementioned glass-containing molding pellets are manufactured, instead of the aforementioned agent-to-be-filled/glass-containing resin composition, is explained.

It should be noted that prior to filing the present application for patent, the inventor of the present invention had studied in earnest forming pellets (glass-containing molding pellets) by blending spherical glass of at least 40 percent by weight into a general-purpose thermoplastic resin and then kneading and extruding the mixture from an extrusion machine, and consequently completed glass-containing molding pellets that would allow up to 70 percent by weight of solid, spherical glass to be contained in a general-purpose thermoplastic resin and thereby filed the application for patent under PCT/JP2008/68093 (Japanese Patent Application No. 2009-50451) (Title of the Invention: "Glass-containing Molding Pellets and Process for Manufacturing the Same," Priority Claim Date: Oct. 4, 2007 (International Patent Application Publication No. WO2009/044884).

The aforementioned solid, spherical glass can be contained in a general-purpose thermoplastic resin by only up to 70 percent by weight because, simply put, kneading and extruding a general-purpose thermoplastic resin containing spherical glass by 70 percent by weight or more would cause the flowability of the molten resin containing spherical glass to drop suddenly and thereby making its extrusion difficult, as described in detail under International Patent Application Publication No. WO2009/044884 cited above.

Forming methods of glass-containing molding pellets made of nine types of resins, along with manufacturing methods of spherical glass, are described in detail under International Patent Application Publication No. WO2009/044884 cited above, and while forming methods of glass-containing molding pellets was already known to the public prior to the filing of the present application for patent, a method to form molding pellets by blending spherical glass into general-purpose thermoplastic resins that are used in large quantities for injection molded products, etc., such as polyethylene resin (hereinafter referred to as "PE"), polypropylene resin (hereinafter referred to as "PP"), polyethylene terephthalate resin (hereinafter referred to as "PET") and polyamide resin (hereinafter referred to as "Ny") is explained below.

(Thermoplastic Resins)

Various types of resins can be used to form thermoplastic resins by the injection molding method or extrusion molding method, where PE, PP, PET and Ny are among the general-purpose thermoplastic resins that are used in large quantities for injection molded products and profile extrusion molded products, and the present invention uses one type of resin selected from the group that includes the aforementioned resins that are well-known crystalline polymers.

(Spherical Glass)

Examples of glass constituting the spherical glass under the present invention include, among others, alkali glass, soluble glass, non-alkali glass and silica glass whose skeletal component is made of one or two or more of $SiO_2$, $B_2O_3$ and $P_2O_5$. Spherical shape can be achieved by crushing and spheroidizing glass fibers, thereby achieving a sharp distribution of average particle sizes. Since a large alkali content in the aforementioned spherical glass tends to make the thermoplastic resin brittle, E glass or silica glass containing no alkali is desired.

The aforementioned spherical glass is made from a material whose glass fibers are 20 μm in diameter. Since glass fibers have a specific diameter, crushed fragments of 20 μm in diameter and 10 to 30 μm in length can be obtained by crushing glass fibers in a manner not causing their length to vary from the aforementioned diameter of 20 μm. These crushed fragments are sprayed over the 2500 to 3000° C. flames of an oxygen burner provided inside a furnace to spheroidize the fragments, after which water containing 0.1 percent by weight of γ-glycidyl oxy propyl methyl diethoxy silane is sprayed from a water spray provided at the bottom of the furnace, and then silanization was performed while the aforementioned water was still present in an atomized state, and glass powder was trapped using a bag filter. The trapped glass powder had a spherical shape with an average particle size of 10 to 40 μm. By using the aforementioned material whose glass fiber was 20 μm in diameter, spherical glass with an average particle size of 10 to 40 μm was obtained. The obtained spherical glass was solid. This method involving silanization using silane in atomized state, as mentioned above, is hereinafter referred to as the "atomization method."

When the aforementioned spheroidized glass is silanized using the aforementioned atomization method, the aforementioned spherical glass is obtained. In other words, this spherical glass is characterized in that its surface is covered entirely by a silane compound.

Examples of this silane compound include those expressed by the formula below:

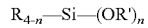

(In the formula, R represents an organic group, R' represents a methyl group, ethyl group or propyl group, and n is an integer of 1, 2 or 3.)

Examples of such silane compound include silane coupling agents having epoxy groups such as vinyl triethoxy silane, vinyl trimethoxy silane, γ-methacryloyl oxy propyl trimethoxy silane, β-(3,4-epoxy cyclohexyl)ethyl trimethoxy silane, γ-glycidyl oxy propyl trimethoxy silane and γ-glycidyl oxy propyl methyl diethoxy silane, silane coupling agents having mercapto groups such as γ-mercaptopropyl trimethoxy silane, and silane coupling agents having amino groups such as γ-amino propyl triethoxy silane, N-β-(amino ethyl)-γ-amino propyl trimethoxy silane and N-β-(N-vinyl benzyl amino ethyl)-γ-amino propyl trimethoxy silane.

Conventional glass spheres comes in various shapes such as polygon and rectangle, and their average particle size is distributed widely in a range of 10 to 100 µm. In contrast, the spherical glass conforming to the present invention has a spherical shape and the average particle size is distributed over a very narrow range of 10 to 40 µm.

Figure 1:
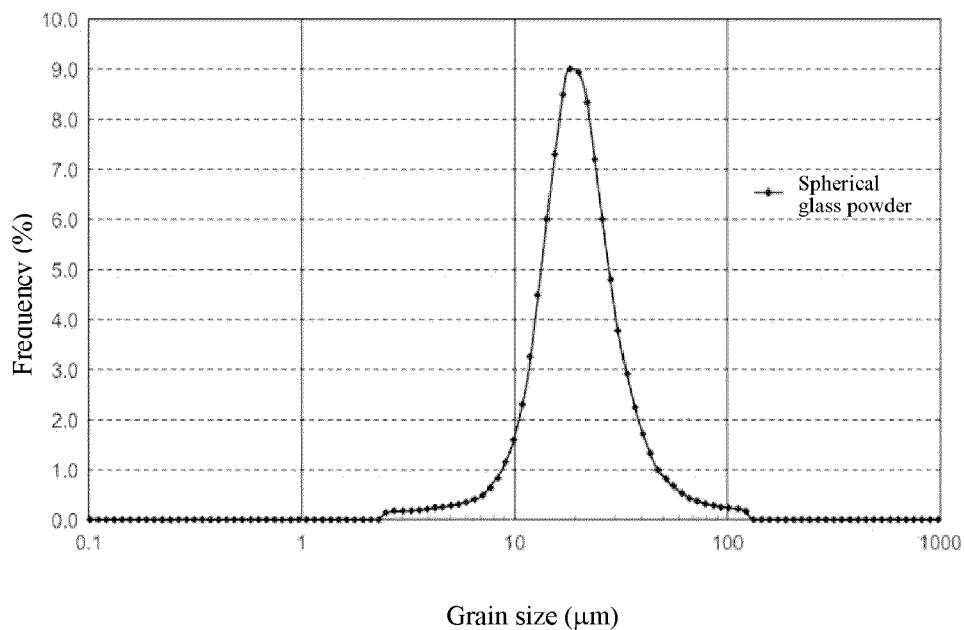
[FIG. 1] A distribution diagram showing a distribution of average particle sizes of spherical glass.

FIG. 1 is a graph showing the frequency of distribution of average particle sizes of spherical glass obtained by the manufacturing method of spherical glass mentioned above.

The horizontal axis of this graph represents the particle size (µm) of the aforementioned spherical glass, while the vertical axis represents the frequency of distribution (%).

The aforementioned spherical E glass has a distribution peak at a particle size of 25 µm, and draws a normal distribution spanning 10 to 40 µm on both sides of this 25-µm point, indicating that the particle sizes in this range occur frequently.

Figure 2:
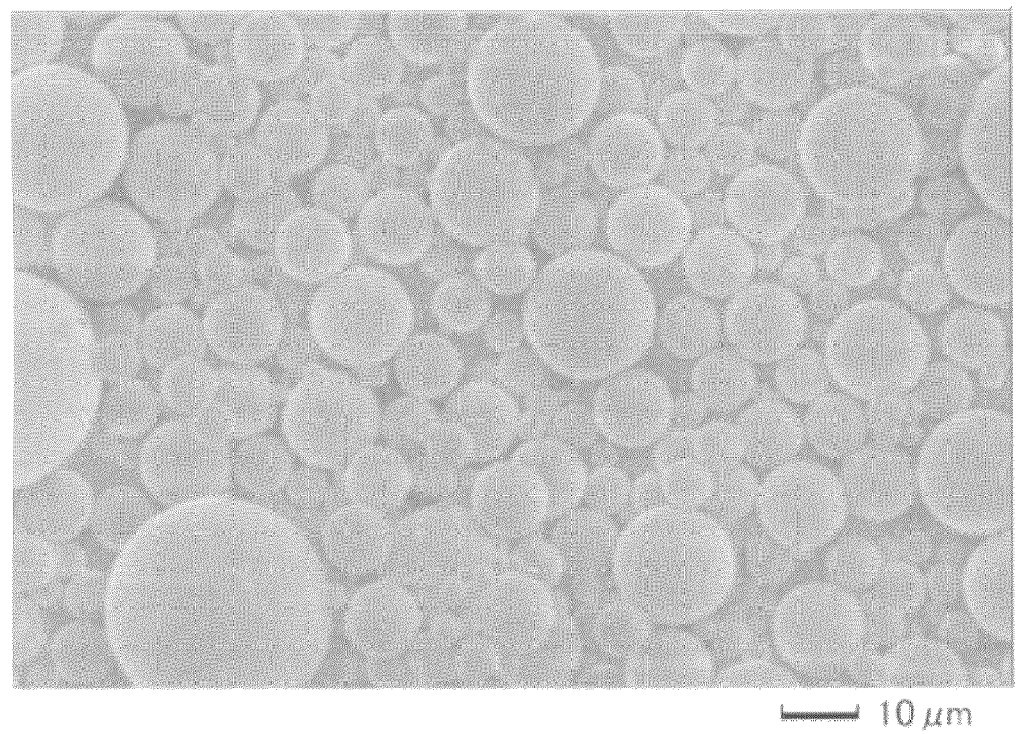
[FIG. 2] A ×1000 electron micrograph of spherical glass.

FIG. 2 is a ×1000 electron micrograph of the aforementioned spherical glass. This micrograph shows that each spherical glass has a spherical shape and is solid, and it has various particle sizes from large to small.

Based on the graph showing the frequency of distribution of average particle sizes of spherical E glass in FIG. 1 and this micrograph in FIG. 2, it is indicated that the spherical glass in the thermoplastic resin has a circular shape and has various particle sizes from large to small, but that its average particle size is in a range of 10 to 40 µm.

It should be noted that when spherical glass is introduced into and kneaded with molten thermoplastic resin, the percentage of fine particles will increase if the particle size of glass is 10 µm or less, in which case the spherical glass will take heat from the resin due to a larger specific surface area and consequently the resin temperature will drop suddenly, thereby causing the melt viscosity to rise and resin temperature to also rise significantly during kneading due to shear heating, and as a result adjusting the blending ratio of the two materials will become difficult. In addition, blending spherical glass into thermoplastic resin generally improves the dimensional stability, mechanical strength (impact strength, bending strength, etc.), warping, permeation barrier property and other characteristics of the resulting molded product.

When the aforementioned particle size becomes 40 µm or more, the percentage of giant particles increases and, although the melt viscosity will not rise much during kneading, the cutting blade will wear intensely when the glass-containing composition is cut to pellets of a specific size, and consequently it will become difficult to continuously produce a large amount of the aforementioned glass-containing composition and production problems will occur. A particle size of 40 µm or more is not desirable because the aforementioned characteristics, especially impact strength, will drop. This gives a desired range of average particle sizes of 10 to 40 µm.

By blending and kneading up to 70 percent by weight of spherical glass into the aforementioned thermoplastic resin in molten state, and then extruding the mixture into a bar of 3 mm in diameter from the nozzle die provided at the outlet of the extrusion machine, followed by water cooling and cutting of the bar to a length of approx. 4 mm, glass-containing molding pellets constituted by glass spheres independently dispersed in the aforementioned thermoplastic resin are obtained. It should be noted, however, that the diameter and length are not at all limited to the foregoing.

Figure 3:
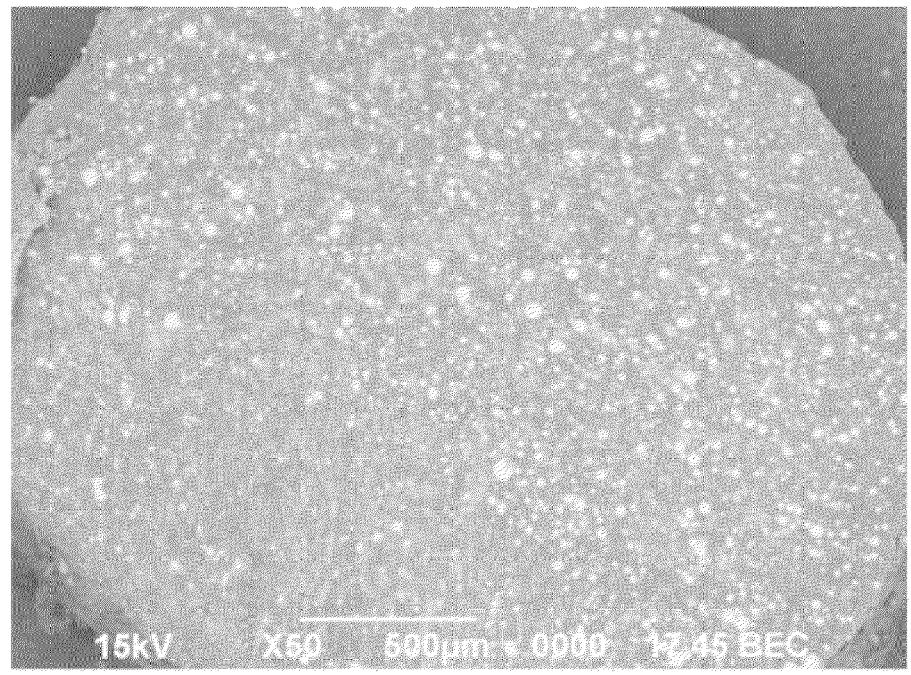
[FIG. 3] An electron micrograph showing a ×50 enlarged view of a cut section, cut vertically from side, of a pellet obtained by blending 50 percent by weight of spherical glass into PP.

FIG. 3 is an electron micrograph showing a ×50 enlarged view of a cut section, cut vertically from the side, of a pellet obtained by blending 50 percent by weight of spherical glass into PP.

From the micrograph of the cut section of the pellet in FIG. 3, the pellet contains individual glass spheres that are blended in such a way as to remain independently dispersed in PP without agglutinating together.

This clearly indicates that the atomization method covers the surface of aforementioned glass entirely with a silane compound so that when the aforementioned pellets are formed through kneading and extrusion of the resin in/from the extrusion machine, glass spheres are independently dispersed in the resin without agglutinating together.

Next, a circle was drawn around the mid point of the micrograph in FIG. 3 passing through the top and bottom edges, and this circle was equally divided into 16 parts and the number of glass spheresglass spheres blended in each of these 16 sections was visually counted. The counting results are shown in Table 1.

Note that when the number of glass spheres was calculated, any glass sphere present on a line dividing any two of the 16 sections was counted as one-half and added to both sections.

TABLE 1

| Section | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Number of glass particles | 140 | 141 | 139 | 140 | 139 | 141 | 140 | 139 | 140 | 140 | 141 | 140 | 140 | 139 | 140 | 141 |

From the measured results in Table 1, the number of glass spheres was in a range of 140±1 in every section, indicating that glass spheres were distributed uniformly in the pellets.

Based on the above, it is found that the glass-containing molding pellets conforming to the present invention, produced by kneading spherical glass and thermoplastic resin pellets in the extrusion machine and then extruding the mixture, are constituted by solid, glass spheres of 10 to 40 µm in average particle size and covered entirely with a silane compound, being contained in the thermoplastic resin independently and in a uniformly dispersed manner at a glass blending ratio in a range of 40 to 70 percent by weight.

FIG. 4 is a longitudinal section view of an example of an extrusion machine used under a manufacturing method where glass-containing thermoplastic resin molding pellets are formed and a composition made thereof is manufactured. Using this extrusion machine, glass-containing molding pellets are obtained by kneading 40 to 70 percent by weight of spherical glass and thermoplastic resin and extruding the mixture.

A step where 40 to 70 percent by weight of spherical glass and thermoplastic resin are kneaded and the mixture is extruded to obtain glass-containing molding pellets is explained based on the extrusion machine in FIG. 4.

The aforementioned extrusion machine is equipped with two hoppers that are used to introduce the materials to be fed, or namely pellets and spherical glass. The hoppers of the extrusion machine shown in FIG. 4 are called a first hopper and a second hopper from the left, and thermoplastic resin pellets are introduced to the first hopper, while spherical glass is introduced to the second hopper provided near the center of the extrusion machine. The layout position of the second hopper is such that the pellets supplied into a screw barrel from the first hopper are melted as they are transported on a screw while being kneaded.

Since the extrusion machine in FIG. 4 is the same as any conventional extrusion machine except for the hopper structures, the structure of the extrusion machine in FIG. 4 is not explained in detail.

(Glass-Containing PE Molding Pellets)

Two types of glass-containing molding pellets were created by using PE (HD-PE) as the thermoplastic resin and adjusting the blending ratio by weight of spherical E glass silanized by the atomization method and PE to 40:60 and 50:50, respectively.

A measured weight of HD-PE (high-density polyethylene), or HI-ZEX 5100B (brand name; manufactured by Prime Polymer), was introduced from the first hopper of the aforementioned extrusion machine so that its content would become 60 percent by weight, and melted at 230° C., after which a measured amount of spherical E glass in the aforementioned example was introduced from the second hopper so that its content would become 40 percent by weight, this time the glass having been preheated to the same level as the melting temperature of 230° C. or thereabouts, and then the mixture was kneaded at 230° C. at a screw speed of 200 revolutions per minute and extruded into a bar of 3 mm in diameter, followed by water cooling and cutting of the bar to a length of 4 mm, to obtain molding pellets of Level 1 under Example 1. The preheating temperature should most preferably be the same as the melting temperature of 230° C. (or thereabouts in a range of 230° C.±10%).

In the same manner, molding pellets of Level 2 constituted by 50 percent by weight of HI-ZEX 5100B and 50 percent by weight of spherical E glass were obtained.

(Glass-Containing PP Molding Pellets)

Two types of glass-containing molding pellets were created by using PP as the thermoplastic resin and adjusting the blending ratio by weight of spherical E glass silanized by the atomization method and PP to 40:60 and 50:50, respectively.

A measured weight of PP, or Novatec PPMA3 (brand name; manufactured by Japan Polypropylene), was introduced from the first hopper of the aforementioned extrusion machine so that its content would become 60 percent by weight, and melted at 220° C., after which a measured amount of spherical E glass in the aforementioned example was introduced from the second hopper so that its content would become 40 percent by weight, this time the glass having been preheated to the same level as the melting temperature of 220° C. or thereabouts, and then the mixture was kneaded at 220° C. at a screw speed of 200 revolutions per minute and extruded into a bar of 3 mm in diameter, followed by water cooling and cutting of the bar to a length of 4 mm, to obtain molding pellets with a glass blending ratio of 40 percent by weight. The preheating temperature should most preferably be the same as the melting temperature of 220° C. (or thereabouts in a range of 220° C.±10%).

In the same manner, molding pellets of Level 2 with a blending ratio of 50 percent by weight of Novatec PPMA3 and 50 percent by weight of spherical E glass were obtained.

(Glass-Containing Pet Molding Pellets)

Two types of glass-containing molding pellets were created by using PET as the thermoplastic resin and adjusting the blending ratio by weight of spherical E glass silanized by the atomization method and PET to 40:60 and 50:50, respectively.

A measured weight of PET, or Vylon FN 305 (brand name; manufactured by Toyobo), was introduced from the first hopper of the aforementioned extrusion machine so that its content would become 60 percent by weight, and melted at 250° C., after which a measured amount of spherical E glass in the aforementioned example was introduced from the second hopper so that its content would become 40 percent by weight, this time the glass having been preheated to the same level as the melting temperature of 250° C. or thereabouts, and then the mixture was kneaded at 250° C. at a screw speed of 200 revolutions per minute and extruded into a bar of 3 mm in diameter, followed by water cooling and cutting of the bar to a length of 4 mm, to obtain molding pellets of Level 1 under Example 3. The preheating temperature should most preferably be the same as the melting temperature of 250° C. (or thereabouts in a range of 250° C.±10%).

In the same manner, molding pellets of Level 2 constituted by 50 percent by weight of Vylon FN 305 and 50 percent by weight of spherical E glass were obtained.

(Glass-Containing Ny Molding Pellets)

Two types of glass-containing molding pellets were created by using Ny as the thermoplastic resin and adjusting the blending ratio by weight of spherical E glass silanized by the atomization method and Ny to 40:60 and 50:50, respectively.

A measured weight of Ny, or Nylon A1030 BRF (brand name; manufactured by Unitika), was introduced from the first hopper of the aforementioned extrusion machine so that its content would become 60 percent by weight, and melted at 230° C., after which a measured amount of spherical E glass in the aforementioned example was introduced from the second hopper so that its content would become 40 percent by weight, this time the glass having been preheated to the same level as the melting temperature of 230° C. or thereabouts, and then the mixture was kneaded at 230° C. at a screw speed of 200 revolutions per minute and extruded into a bar of 3 mm in diameter, followed by water cooling and cutting of the bar to a length of 4 mm, to obtain molding pellets of Level 1 under Example 9. The preheating temperature should most preferably be the same as the melting temperature of 230° C. (or thereabouts in a range of 230° C.±10%).

In the same manner, molding pellets of Level 2 constituted by 50 percent by weight of Nylon A1030 BRF and 50 percent by weight of spherical E glass were obtained.

Note that while the spherical glass introduced into the extrusion machine was preheated to the same level as the melting temperature or thereabouts in the aforementioned examples of PE, PP, PET and Ny molding pellets, the present invention is not at all limited to these examples and the melting temperature (heating, cooling), screw speed and other manufacturing conditions can be controlled at levels traditionally used in the forming of pellets.

The foregoing explained PE, PP, PET and Ny molding pellets. As mentioned above, PE, PP, PET and Ny agent-to-be-filled/glass-containing resin compositions can be manufactured in a similar method by introducing an agent-to-be-filled from the aforementioned second hopper in addition to spherical E glass.

Figure 5:
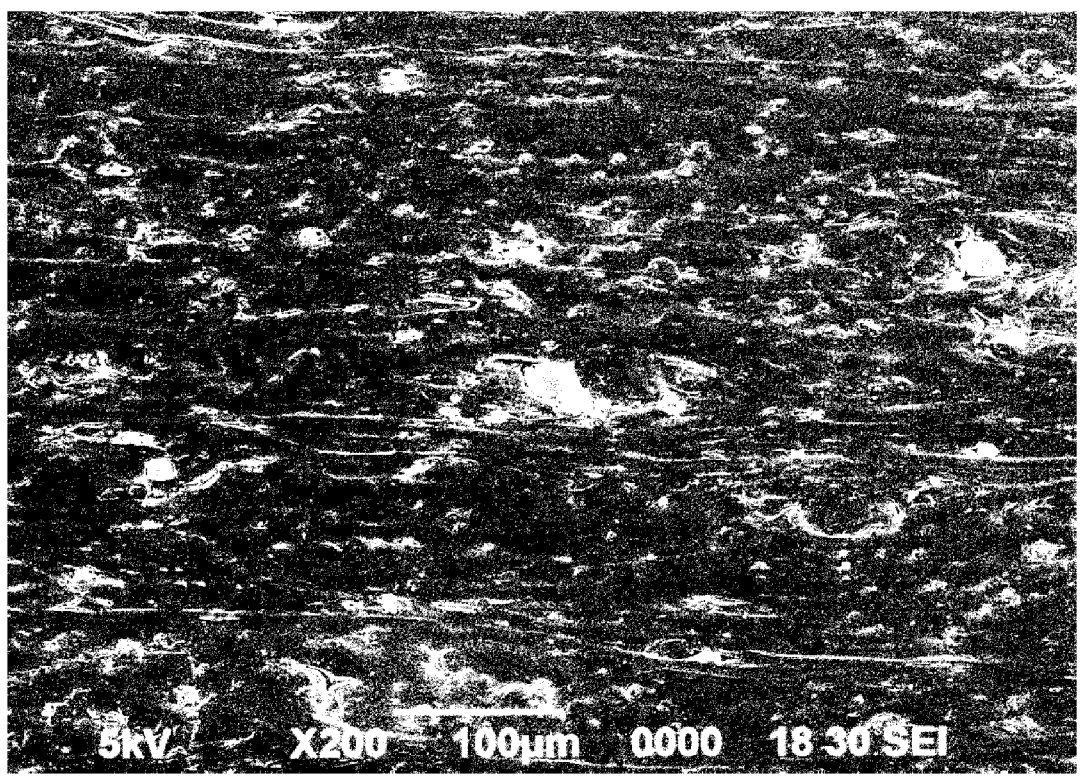
[FIG. 5] An electron micrograph showing a ×200 enlarged front view of the surface of a PP injection molded product with a glass blending ratio of 50 percent by weight.
Figure 6:
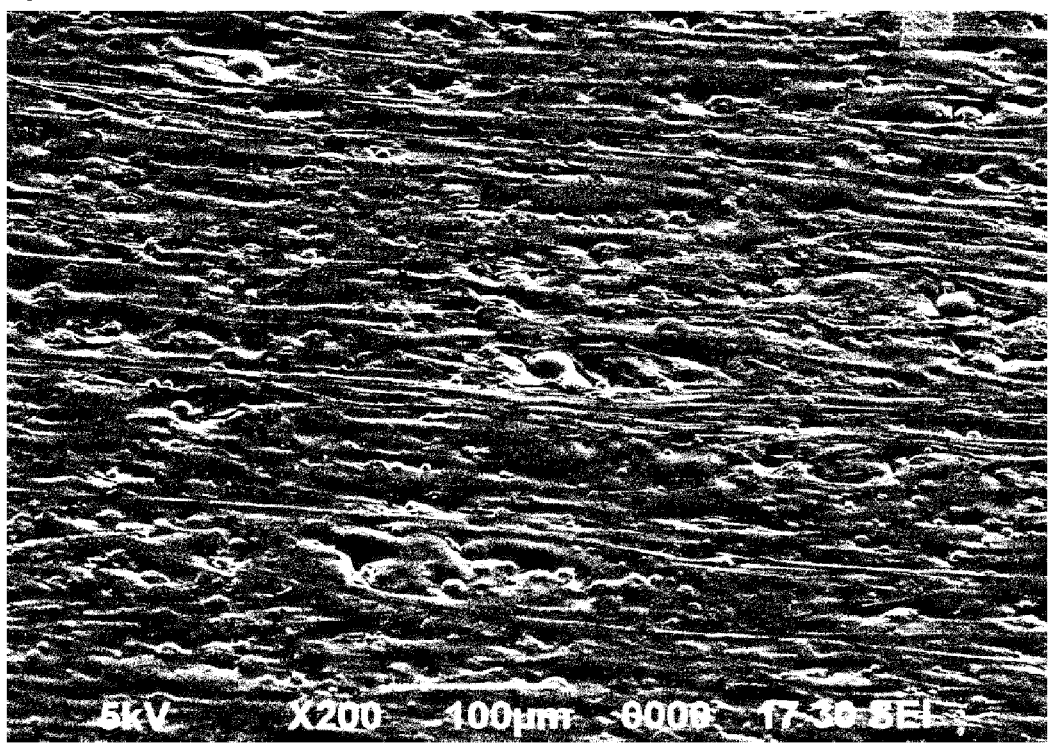
[FIG. 6] An electron micrograph showing a ×200 enlarged view from a 45-degree angle of the surface of a PP injection molded product with a glass blending ratio of 50 percent by weight.

It should be noted that the inventor of the present invention took micrographs of the surface of the aforementioned PP injection molded product with a glass blending ratio of 50 percent by weight at a 200 magnification using an electron microscope. FIG. 5 is an electron micrograph showing a ×200 enlarged front view of the surface of the PP injection molded product with a glass blending ratio of 50 percent by weight. FIG. 6 is an electron micrograph showing a ×200 enlarged view from a 45-degree angle of the surface of the PP injection molded product with a glass blending ratio of 50 percent by weight. FIGS. 5 and 6 show the characteristic shape of an injection molded surface where a number of large and small spherical convex shapes are distributed.

These large and small distributed spherical convex shapes were formed as a result of contact with the die surface of the molten PP containing spherical glass. A skin layer forms on the surface of any injection molded product made of 100% resin, but the spherical convex shapes in FIGS. 5 and 6 indicate that, given the 100-μm scale of these micrographs, a number of glass spheres are present on the surface where a skin layer is normally formed, and probably this is why no skin layer is formed on the surface of this glass-containing resin molded product.

Figure 7:
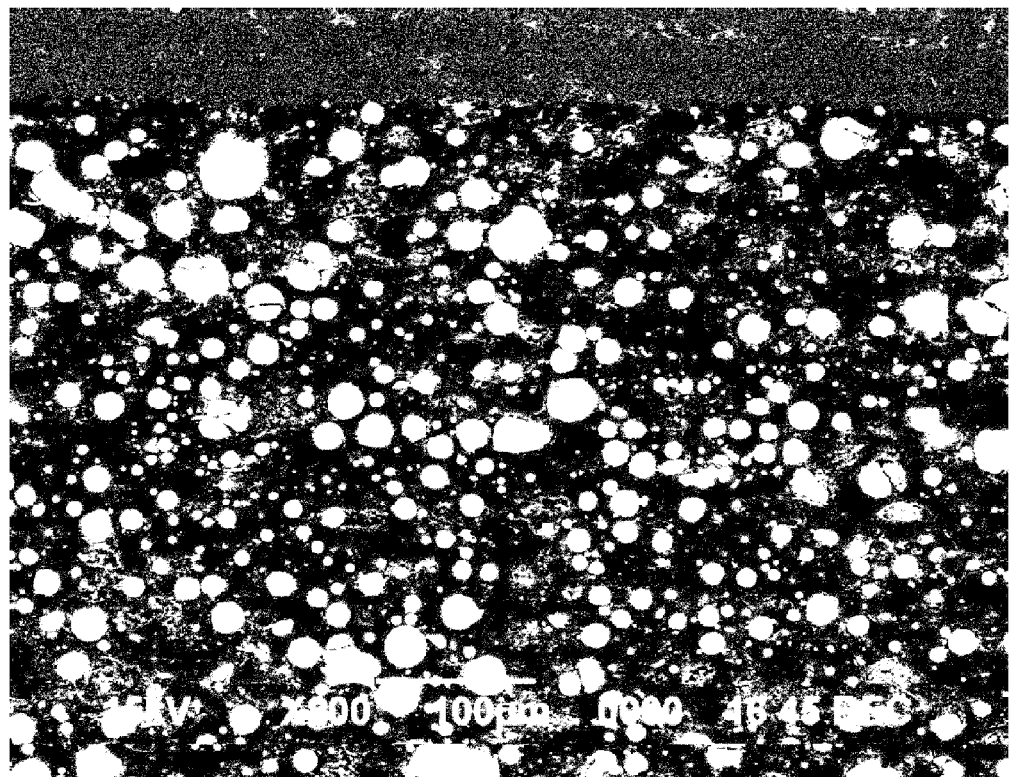
[FIG. 7] An electron micrograph showing a ×200 enlarged view of a section of a PP injection molded product with a glass blending ratio of 50 percent by weight.

Accordingly, the aforementioned PP injection molded product with a glass blending ratio of 50 percent by weight was cut and the cut surface was observed with an electron microscope, in order to examine the surface structure and determine if a skin layer was formed on the surface of the injection molded product. FIG. 7 is an electron micrograph showing a ×200 enlarged view of the section of the PP injection molded product with a glass blending ratio of 50 percent by weight. The black area at the top of the micrograph corresponds to the acrylic resin used to facilitate the cutting of the injection molded product, while the white spherical areas are glass spheres and the part surrounding these glass spheres is the injection molded product including the surface. It is clear that while a skin layer forms on the surface of any injection molded product made of 100% resin (at 0 to at least 150 μm from the surface), given the micrograph scale of 100 μm there are a number of glass spheres distributed on the surface where a skin layer is normally formed. Accordingly, the section micrograph of the injection molded product in FIG. 7 indicates that no skin layer will form and glass spheres will remain present on the surface of a glass-containing resin molded product whose glass blending ratio is 50 percent by weight.

Next, an attempt was made to directly capture the skin layers of a 100% resin molded product and other resin molded products having incremental glass blending ratios from 0, by using an electron microscope, in order to examine the mechanism of why no skin layer forms on the surface of some glass-containing resin molded products. Incidentally, capturing such a skin layer with an electron microgram has been reported to be difficult. Attempts have been made to measure such a skin layer using an indirect method, or specifically laser Raman spectroscopy explained below, and the results suggest that measurement of skin layer is possible using laser Raman spectroscopy.

(Measurement of Skin Layer)

As a method for measuring skin layer, results of skin layer measurement using laser Raman spectroscopy are reported in a research paper. This research paper examined whether or not laser Raman spectroscopy could be applied to analysis of the molecular orientation of injection molded products, where molecular orientation measurement was performed on polystyrene resin and an oriented layer was measured only within a thickness of 100 to 200 μm from the surface along counterflow weld lines and consequently laser Raman spectroscopy was judged effective for molecular orientation analysis ("Kagaku to Kogyo (Chemistry and Chemical Industry)," Research Paper: Structural Evaluation of Injection Molded Products by Laser Raman Spectroscopy, 81 (9), pp. 433-438 (2007)). In addition, C. M. Tobin reports the attribution of each peak in a Raman spectrum of PP and its relationship with crystallinity in J. Phys. Chem. (64, 216, 1960). Furthermore, Houska and Brummell report that Raman spectra of PP injection molded products show peaks in 998 cm$^{-1}$, 900 cm$^{-1}$ and other band fractions based on crystalline orientation in Polym. Eng. Sci. (27, 12, 917-924, 1987), indicating that peaks in fractions near the surface represent a skin layer.

Accordingly, skin layer measurement was performed using laser Raman spectroscopy on injection molded products made of PP, and LDPE (low-density polyethylene resin) constituted by a crystalline polymer but whose crystallinity is low, among the aforementioned crystalline polymers PE, PP, PET and Ny.

(Skin Layer of Crystalline Polymer PP)

Using an injection molded product made of 100% PP resin whose glass blending ratio was 0 percent by weight on which a skin layer would form, as a comparative example, and five types of PP injection molded products with glass blending ratios of 7 percent by weight, 20 percent by weight, 30 percent by weight, 40 percent by weight and 60 percent by weight as examples, an experiment was conducted in an attempt to identify the percentage of glass blending ratio at which the skin layer would not appear.

To be specific, glass spheres of 20 μm in average particle size (particle size measured by the scatter method, wet method; LA-920 manufactured by Horiba) were blended with PP (Novatec PPMA3 manufactured by Japan Polypropylene) at blending ratios of 0 percent by weight, 7 percent by weight, 20 percent by weight, 30 percent by weight, 40 percent by weight and 60 percent by weight, respectively, to form six types of glass-containing molding pellets, and these pellets were processed through an injection molding machine based on JIS K 7162 to create test pieces. Under the injection molding conditions of 240° C. in melting temperature, 50 kg/cm$^2$ in pressure and 60° C. in die temperature, test pieces were molded and their center was cut out using a cutting machine manufactured by EXAKT. Each cut surface was polished for 2 minutes using water-resistant abrasive paper No. 1200, and then polished for another 2 minutes using alumina powder of 0.05 μm in particle size. Next, laser Raman spectrophotometer NRS-3100 was used to measure a Raman spectrum of the cut surface by covering the surface through the interior of the molded product (refer to FIG. 8).

Figure 8:
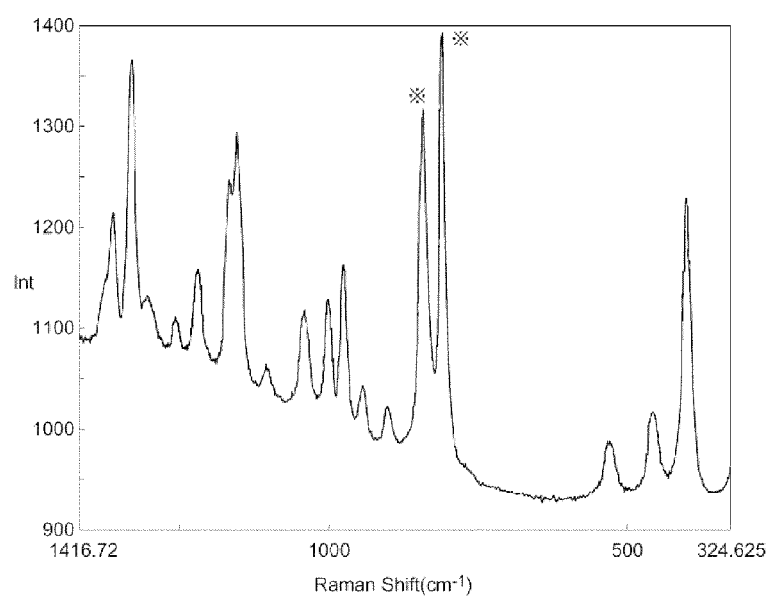
[FIG. 8] A figure showing a Raman spectrum of 100% PP resin.
Figure 9:
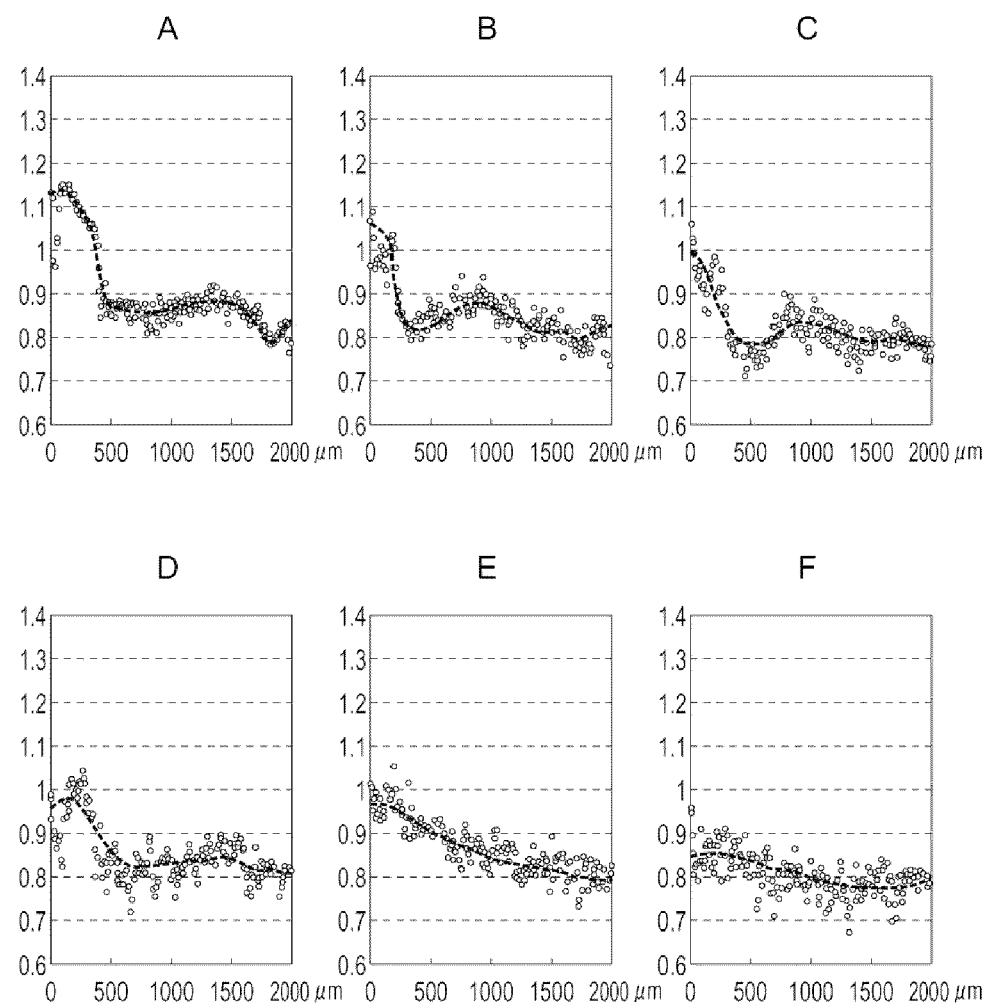
[FIG. 9] Graph showing the Raman intensity ratios of injection molded products made of 100% PP resin and resins with glass blending ratios of 7 percent by weight, 20 percent by weight, 30 percent by weight, 40 percent by weight and 60 percent by weight, measured at distances of 0 to 2000 μm from their surface.

FIG. 8 shows the Raman spectrum of 100% PP resin. The horizontal axis indicates the wavelength, while the vertical axis represents the intensity. When the Raman intensity ratio between 844-cm$^{-1}$ and 813-cm$^{-1}$ wavelengths in the Raman spectrum in FIG. 8 (844 cm$^{-1}$/813 cm$^{-1}$) is obtained, the aforementioned two wavelengths are measured at distances of 0 to 2000 μm from the surface, and Raman intensity ratios are calculated from the measured results and plotted using "○" marks, the graphs in FIG. 9 are achieved. FIG. 9 presents graphs showing the Raman intensity ratios of injection molded products made of 100% PP resin and resins having glass blending ratios of 7 percent by weight, 20 percent by weight, 30 percent by weight, 40 percent by weight and 60 percent by weight, measured at distances from 0 to 2000 μm from the surface. It should be noted that the curves in FIG. 9 are linear representations of the average Raman intensity ratios at each of the aforementioned distances corresponding to "○" marks for easier, visual understanding of the trend of Raman intensity ratios. FIG. 9A is a Raman spectrum corresponding to a glass blending ratio of 0 percent by weight in Comparative Example 1, FIG. 9B is a Raman spectrum corresponding to a glass blending ratio of 7 percent by weight in Example 1, FIG. 9C is a Raman spectrum corresponding to a glass blending ratio of 20 percent by weight in Example 2, FIG. 9D is a Raman spectrum corresponding to a glass blending ratio of 30 percent by weight in Example 3, FIG. 9E is a Raman spectrum corresponding to a glass blending ratio of 40 percent by weight in Example 4, and FIG. 9F is a Raman spectrum corresponding to a glass blending ratio of 60 percent by weight in Example 5.

In Comparative Example 1 shown in FIG. 9A, the Raman intensity ratio rises sharply in a range of 0 to 400 μm where the peak exceeds 1.1, and then falls flat in a range of 400 to 2000 μm. In Example 1 shown in FIG. 9B, the Raman intensity ratio also rises sharply in a range of 0 to 400 μm where the peak exceeds 1.0, and then falls flat in a range of 400 to 2000 μm. In Example 2 shown in FIG. 9C, the Raman intensity ratio also rises sharply in a range of 0 to 400 μm where the peak is near 1.0, and then falls flat in a range of 400 to 2000 μm. In Example 3 shown in FIG. 9D, the Raman intensity ratio also rises sharply in a range of 0 to 400 μm where the peak is a little lower than the peak at the glass blending ratio of 20 percent by weight, and then falls flat in a range of 400 to 2000 μm. In Example 4 shown in FIG. 9E, the Raman intensity ratio gradually decreases from no more than 1.0 in a range of 0 to 400 μm, and this trend is maintained in a range of 400 to 2000 μm where there is no peak. In Example 5 shown in FIG. 9F, the Raman intensity ratio is flat at no more than 0.9 throughout a range of 0 to 2000 μm where there is no peak.

In Comparative Example 1 shown in FIG. 9A and Examples 1 to 3 shown in FIGS. 9B to 9D, the Raman spectrum shape peaks in a range of 0 to 400 μm, but the heights of peaks are incrementally lower as the glass blending ratio increases. In Example 4 shown in FIG. 9E, the spectrum is gradually falling and there is no peak, and in Example 5 shown in FIG. 9F the spectrum remains flat and there is no peak. Since each peak mentioned above indicates formation of skin layer, with respect to the above Raman spectrum shapes in Comparative Example 1 shown in FIG. 9A and Examples 1 to 3 shown in FIGS. 9B to 9D, where a peak is shown in a range of glass blending ratios of 0 to less than 40 percent by weight, although the height of the peak decreases as the blending ratio increases, it is clear that a skin layer is formed on the surface of the aforementioned glass-containing resin molded product. In Examples 4 and 5 shown in FIGS. 9E and 9F, however, there is no peak at glass blending ratios of 40 and 70 percent by weight, indicating that at these glass blending ratios no skin layer is formed on the surface of the aforementioned glass-containing resin molded product.

(Skin Layer on LDPE of Low Crystallinity)

Using as Comparative Example 2 an injection molded product made of 100% LDPE resin (resin of low crystallinity) whose glass blending ratio was 0 percent by weight on which a skin layer would form, and as Example 6 an injection molded product made of the same LDPE but containing 50 percent by weight of glass, an experiment was conducted in an attempt to examine whether or not the skin layer would not appear on the injection molded product with a glass blending ratio of 50 percent by weight.

To be specific, the same glass spheres used in the examples of PP were blended with LDPE (Novatec LDLJ802 manufactured by Japan Polypropylene) at blending ratios of 0 percent by weight and 50 percent by weight, respectively, to form two types of glass-containing molding pellets, and these pellets were processed through an injection molding machine based on JIS K 7162 to create test pieces. Under the injection molding conditions of 240° C. in melting temperature, 50 kg/cm² in pressure and 60° C. in die temperature, test pieces were molded and their center was cut out using a cutting machine manufactured by EXAKT. Each cut surface was polished for 2 minutes using water-resistant abrasive paper No. 1200, and then polished for another 2 minutes using alumina powder of 0.05 μm in particle size. Next, laser Raman spectrophotometer NRS-3100 was used to measure a Raman spectrum of the cut surface by covering the surface through interior of the molded product (refer to FIG. 10).

Figure 10:
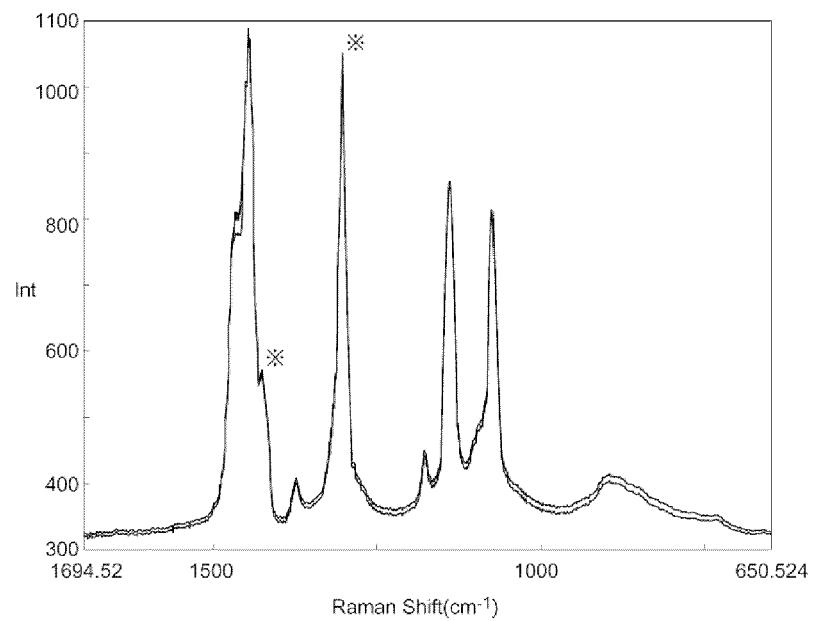
[FIG. 10] A figure showing a Raman spectrum of 100% LDPE resin.

FIG. 10 shows the Raman spectrum of 100% LDPE resin. The horizontal axis represents the wavelength, while the vertical axis represents the intensity. When the Raman intensity ratio between 1421.22-cm$^{-1}$ and 1298.22-cm$^{-1}$ wavelengths in the Raman spectrum in FIG. 10 (1421.22 cm$^{-1}$/1298.22 cm$^{-1}$) is obtained, the aforementioned two wavelengths are measured at distances of 0 to 2000 μm from the surface, and Raman intensity ratios are calculated from the measured results and plotted, the graphs in FIG. 11 are achieved.

Figure 11:
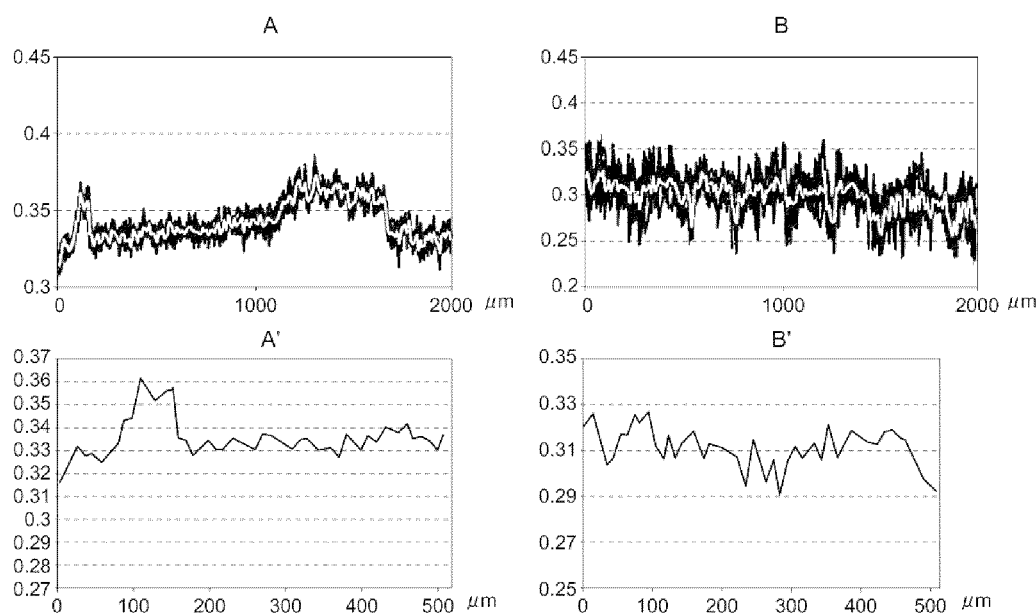
[FIG. 11] Graph showing the Raman intensity ratios of injection molded products made of 100% LDPE resin and 50% LDPE resin by weight, measured at distances of 0 to 2000 μm from their surface.

FIG. 11 presents graphs showing the Raman intensity ratios of injection molded products made of 100% LDPE resin and resin having a glass blending ratio of 50 percent by weight, measured at distances from 0 to 2000 μm from the surface. FIG. 11A is a Raman spectrum corresponding to Comparative Example 2, while FIG. 11B is a Raman spectrum corresponding to Example 6.

Note that while the graphs of Comparative Example 2 in FIG. 11A and Example 6 in FIG. 11B plot Raman intensity ratios at different distances from 0 to 2000 μm from the surface, the graphs in FIGS. 11A' and 11B' are linear expressions of average Raman intensity ratios at each of the distances from 0 to 500 μm from the surface, which are then enlarged to four times the distances for easier, visual understanding of the trend of Raman intensity ratios on the surface layer.

In the graph in FIG. 11A', the Raman intensity ratio rises sharply in a range of 100 to 150 μm where the peak exceeds 0.35, but it is less than 0.35 and flat in a range of 200 to 500 μm. In the graph in FIG. 11B', the Raman intensity ratio is less than 0.33 in a range of 0 to 500 μm where it remains flat without showing any peak.

When the above results are analyzed, it is clear that a skin layer is formed on the aforementioned glass-containing resin molded product in a range of 0 to 150 μm in Comparative Example 2, because a peak is shown in a range of 100 to 150 μm. In Example 6, however, no peak manifests in a range of 100 to 150 μm, indicating that no skin layer is formed on the surface of the aforementioned glass-containing resin molded product. The result of Comparative Example 2 where a skin layer was formed in a range of 0 to 150 μm agrees with the report in the aforementioned research paper "Chemistry and Chemical Industry" that an orientated layer exists over a thickness of 100 to 200 μm from the surface.

It should be noted that the term "surface" as in "surface of 100% resin molded product" or "surface of glass-containing resin molded product" is defined not simply as "outermost or uppermost part of something" as generally understood, but also implies thickness and is used as such. For example, when "surface" in "surface of glass-containing resin molded product" is used to mean "outermost or uppermost part of something" as generally understood, then the term "front side" is used. If it is used to also imply thickness, however, the term "surface" is used. In this case, the term "surface" refers to a thickness over a range 0 to at least 150 μm from the surface of glass-containing resin molded product, and accordingly attention should be paid to the aforementioned meanings in locations where "surface" and "front side" are used.

As explained earlier, in the field of resin molding technology it is a matter of fact that a skin layer is formed on the surface of 100% resin molded products. However, the measured results of Raman intensity ratios under Examples 4 and 5 involving PP and Example 6 involving PE are quite shocking as they reverse this matter of technical commonsense. It is clear that while a skin layer is formed on the surface of a molded product in a range of 0 to at least 150 μm from the surface when the aforementioned spherical glass is blended into the resin by 0 to less than 40 percent by weight, no skin layer is formed on the aforementioned resin molded product if the aforementioned spherical glass is blended by at least 40 percent by weight, in which case spherical glass remains present on the surface.

An important fact emerging from these results is that as long as spherical glass is blended into a resin by at least 40 percent by weight, no skin layer is formed on the resin covering the glass.

Accordingly, as the above results of skin layer measurement by laser Raman spectroscopy found that blending spherical glass into a resin by at least 40 percent by weight would prevent a skin layer from forming on the resin covering the glass, an agent-to-be-filled/glass-containing resin composition was manufactured by melting and kneading resin pellets, at least 40 percent by weight of spherical glass, and an agent-to-be-filled, and this agent-to-be-filled/glass-containing resin composition was melted/kneaded and molded into the agent-to-be-filled/glass-containing resin molded products, and then an experiment was conducted to see if the agent-to-be-filled would sufficiently effectuate its inherent action. In the experiment, an antibacterial agent, antibacterial/antifungal agent, flame retardant and antistatic agent were used as fillers. To be specific, silver zeolite was used for the antibacterial agent, silver glass/cupric oxide was used for the antibacterial/antifungal agent, antimony trioxide was used for the flame retardant, and carbon black was used for the antistatic agent.

1. Antibacterial agent, 2. Antibacterial/antifungal agents, 3. Flame retardant and 4. Antistatic agent are explained in this order.

1. Antibacterial Agent (Example of Antibacterial Agent)

In Example 30, Ny, spherical glass and a silver antibacterial agent were blended. For the silver antibacterial agent, AEON (containing Ag by 0.3 percent by weight) (manufactured by Sinanen Zeomic), which is a silver zeolite, was used. A total of four levels of samples were prepared in Example 30 by adjusting the weight blending ratio of Ny, spherical glass and the silver antibacterial agent to 40:59.95:0.05, 40:59.90: 0.1, 50:49.95:0.05 and 50:49.90:0.1, respectively. Examples of the silver antibacterial agent include silver zeolite, silver glass and silver zirconium phosphate.

(Comparative Example of Antibacterial Agent)

In Comparative Example 30, Ny was blended with spherical glass but not with silver zeolite in some samples, while Ny was blended with silver zeolite but not with spherical glass in others. For samples in Comparative Example 30 where Ny was blended with spherical glass but not with silver zeolite, the weight blending ratio of Ny and spherical glass was adjusted to 40:60 and 50:50, respectively. For samples where Ny was blended with silver zeolite but not with spherical glass, the weight blending ratio of resin and silver zeolite was adjusted to 100:0, 99.5:0.5 and 99.0:1.0, respectively. In total, samples of five levels were prepared under Comparative Example 30. Note that the particle size of the aforementioned silver zeolite was 3 to 6 μm.

The aforementioned blending ratios of solid glass, Ny and antibacterial agent under Example 30 and Comparative Example 30 are shown in Table 2.

TABLE 2

|  | Example 30 | | Comparative Example 30 | | |
| --- | --- | --- | --- | --- | --- |
| Spherical glass | 40 | 50 | 40 | 50 | 0 |
| Ny | 59.95, 59.90 | 49.95, 49.90 | 60 | 50 | 100, 99.5, 99.0 |
| Silver zeolite | 0.05, 0.1 | 0.05, 0.1 | 0.0 | 0.0 | 0.0, 0.5, 1.0 |

(Injection Molded Products)

100% resin pellets or pellets with a glass blending ratio of 40 or 50 percent by weight were introduced from the hopper of the injection molding machine, along with an agent-to-be-filled (except for the samples with glass blending ratios of 40 and 50 percent by weight under the Comparative Example), and a sheet of 8×6 cm in size and 1.5 mm in thickness was formed under the conditions of 230° C. being the temperature of the pellet introduction part of the aforementioned injection molding machine, 240° C. being the screw center temperature, 245° C. being the temperature of the extrusion part, and 50 kg/m² of pressure.

(Antibacterial Test)

An antibacterial test was conducted based on JIS Z 2801. For the bacterial strains, staphylococcus aureus (NBRC 12732) and colon bacillus (NBRC 3301) were planted by $2.5 \times 10^5$ counts/ml and cultured at 35° C. for 24 hours, after which the culture medium was washed and the viable cell count was measured.

Table 3 shows the antibacterial test results of Example 30 and Comparative Example 30.

The first column of Table 3 shows glass blending ratios, with the samples in Example 30 with glass blending ratios of 40 percent by weight and 50 percent by weight shown on top, followed by the samples in Comparative Example 30. The second column shows blending ratios of antibacterial agent, indicating the blending ratios of silver zeolite (AEON) in Example 30 and Comparative Example 30 above. The third and fourth columns show antibacterial test results with different bacteria, with the third column showing the results with staphylococcus aureus and fourth column, with colon bacillus.

TABLE 3

|  | Silver zeolite (Ag 0.3 wt %) | *Staphylococcus aureus* (count/ml) | Colon *bacillus* (count/ml) |
| --- | --- | --- | --- |
| Example 30 (blending ratio 40) | 0.05 | $6.3 * 10^2$ | $3.5 * 10^2$ |
|  | 0.10 | <10 | <10 |
| Example 30 (blending ratio 50) | 0.05 | $5.6 * 10^2$ | $2.3 * 10^2$ |
|  | 0.10 | <10 | <10 |
| Comparative Example 30 |  |  |  |
| (blending ratio 40) | 0.00 | $1.5 * 10^5$ | $2.4 * 10^5$ |
| (blending ratio 50) | 0.00 | $1.8 * 10^5$ | $2.5 * 10^5$ |
| Comparative Example 30 | 0.00 | $1.9 * 10^5$ | $3.1 * 10^5$ |
| (100% resin) | 0.50 | $6.7 * 10^2$ | $4.3 * 10^2$ |
| (100% resin) | 1.00 | <10 | <10 |

Table 3 above shows that in Comparative Example 30, the samples made of 100% Ny and resins with glass blending ratios of 40 percent by weight and 50 percent weight, all of which were free of silver zeolite, generated staphylococcus aureus and colon bacillus, while the sample containing 0.50 percent by weight of silver zeolite also generated staphylococcus aureus and colon bacillus. The sample containing 1.0 percent by weight of silver zeolite exhibited antibacterial property. In Example 30 involving samples of 40 percent by weight and 50 percent by weight in glass blending ratio, on the other hand, the sample containing 0.1 percent by weight of silver zeolite exhibited antibacterial property. This indicates that by blending 0.1 percent by weight of silver zeolite in glass-containing molding pellets, the antibacterial action of silver zeolite can be effectuated efficiently. In other words, the samples in Example 30 containing 0.1 percent by weight of silver zeolite exhibited the same level of antibacterial action at one-tenth the amount of silver zeolite blended into the aforementioned sample in Comparative Example 30 containing 1.00 percent by weight of silver zeolite.

From the above test results, the samples in Example 30 (containing 0.1 percent by weight of silver zeolite) effectuate the same level of antibacterial action as the sample in Comparative Example 30 (containing 1.00 percent by weight of silver zeolite). The fact that the samples of Example 30 effectuate the same level of antibacterial action as the sample in Comparative Example 30 at the weight blending ratio of silver zeolite at one-tenth that of the sample in Comparative Example 30 proves that, while a skin layer is believed to prevent silver ions of antibacterial agent from bleeding out to the surface of 100% resin molded product, a molded product containing 40 percent by weight or 50 percent by weight of spherical glass has no skin layer formed on it and therefore spherical glass and silver zeolite are present on its surface and consequently silver ions of an antibacterial agent can bleed out to the surface.

It should be noted that it is well known that a silver antibacterial agent effectuates antibacterial action due to production of silver ions by moisture, and even if the silver antibacterial agent is covered with a resin film, it still effectuates antibacterial action as long as moisture permeates the resin and its film is thin. The relationship of the type of resin, film thickness, and moisture permeability indicating the degree of permeation of moisture, is explained below. The moisture permeability of PE film is 15 to 20 $g/m^2$ per 24 hours at a thickness of 30 μm, moisture permeability of PP film is 5 to 7 $g/m^2$ per 24 hours at a thickness of 20 μm, moisture permeability of Ny film is 120 $g/m^2$ per 24 hours at a thickness of 15 μm, and moisture permeability of PET film is 20 to 55 $g/m^2$ per 24 hours at a thickness of 12 μm. Accordingly, sufficient antibacterial action can be effectuated even when the antibacterial agent is covered with a film of not more than several μm in thickness.

2. Antibacterial/Antifungal Agents
(Example of Antibacterial/Antifungal Agents)

In Example 35, spherical glass, PP, an antibacterial agent and antifungal agent were blended. Silver glass (PG721ST manufactured by Koa Glass) was used for the silver antibacterial agent, while cupric oxide was used for the antibacterial agent. In Example 35, two levels of samples were prepared by adjusting the weight blending ratio of spherical glass, PP, silver glass and cupric oxide to 40:59.85:0.1:0.05 and 50:49.85:0.1:0.05, respectively.

(Comparative Example of Antibacterial/Antifungal Agents)

In Comparative Example 35, PP was blended with spherical glass but not with silver glass and cupric oxide in some samples, while PP was blended with silver glass and cupric oxide but not with spherical glass in others. For samples in Comparative Example 35 where PP was blended with spherical glass but not with silver glass and cupric oxide, the weight blending ratio of PP and spherical glass was adjusted to 40:60 and 50:50, respectively. For samples where PP was blended with silver glass and cupric oxide but not with spherical glass, the weight blending ratio of resin, silver glass and cupric oxide was adjusted to 100:0:0, 99.4:0.5:0.1 and 98.9:1.0:0.1, respectively. In total, samples of five levels were prepared under Comparative Example 35.

The aforementioned blending ratios of solid glass, PP, silver glass and cupric oxide under Examples 35 and Comparative Examples 35 are shown in Table 4.

TABLE 4

|  | Example 35 | | Comparative Example 35 | | | | |
|---|---|---|---|---|---|---|---|
| Spherical glass | 40 | 50 | 40 | 50 | | 0 | |
| PP | 59.85 | 49.85 | 60 | 50 | 100 | 99.4 | 98.9 |
| Silver glass | 0.1 | 0.1 | 0 | 0 | 0.0 | 0.5 | 1.0 |
| Cupric oxide | 0.05 | 0.05 | 0 | 0 | 0.0 | 0.1 | 0.1 |

(Injection Molded Products)

100% resin pellets or pellets with a glass blending ratio of 40 percent by weight or 50 percent by weight were introduced from the hopper of the injection molding machine, along with fillers (except for the samples with glass blending ratios of 40 and 50 percent by weight under the Comparative Example), and a sheet of 8×6 cm in size and 1.5 mm in thickness was formed under the conditions of 240° C. being the temperature of the pellet introduction part of the aforementioned injection molding machine and 50 $kg/cm^2$ of pressure.

(Antibacterial Test)

This test was conducted in the same manner as that of the antibacterial agent under 1, "Antibacterial Agent."

(Antifungal Test)

The antifungal test was conducted based on JIS Z 2911. Five specified types of blended mold fungi were cultured for four weeks using an inorganic salt agar medium per method A, and growth of fungal threads (Indication 0 to 3) was determined according to the criteria shown in Table 5 below.

TABLE 5

| Growth of fungal threads | Indication |
|---|---|
| No fungal growth is recognized by the naked eye. | 0 |
| No fungal growth is recognized by the naked eye, but growth is observed on a microscope. | 1 |
| Fungal growth does not exceed 25% of the total area. | 2 |
| Fungal growth exceeds 25% of the total area. | 3 |

Table 6 shows the antibacterial test results of Example 35 and Comparative Example 35.

The first column of Table 6 shows the glass blending ratios, where the blending ratios of 40 percent by weight and 50 percent by weight at the top correspond to Example 35, and the blending ratios under Comparative Example 35 are shown below. The second column shows the blending ratios of silver glass, while the third column indicates the blending ratios of cupric oxide. The fourth and fifth column show the antibacterial test results using staphylococcus aureus and colon bacillus, respectively, while the sixth column indicates the results of fungal thread growth.

TABLE 6

|  | Silver glass | Cupric oxide | Staphylococcus aureus (count/ml) | Colon bacillus (count/ml) | Growth of fungal threads |
|---|---|---|---|---|---|
| Example 35 (blending ratio 40) | 0.1 | 0.01 | <10 | <10 | 0 |
| Example 35 (blending ratio 50) | 0.1 | 0.01 | <10 | <10 | 0 |

TABLE 6-continued

|  | Silver glass | Cupric oxide | Staphylococcus aureus (count/ml) | Colon bacillus (count/ml) | Growth of fungal threads |
|---|---|---|---|---|---|
| Comparative Example 30 | | | | | |
| (blending ratio 40) | 0.0 | 0.00 | $1.3 * 10^5$ | $1.6 * 10^5$ | 3 |
| (blending ratio 50) | 0.0 | 0.00 | $1.5 * 10^5$ | $1.7 * 10^5$ | 3 |
| Comparative Example 35 | | | | | |
| (100% PP) | 0.5 | 0.05 | $7.4 * 10^3$ | $5.5 * 10^3$ | 1 |
| (100% PP) | 1.0 | 0.10 | <10 | <10 | 0 |

Table 6 above shows that, with respect to Comparative Example 35, the samples of 100% PP and with glass blending ratios of 40 percent by weight and 50 percent by weight, all of which did not contain silver glass or cupric oxide, generated staphylococcus aureus and colon bacillus and their fungal thread growth corresponded to Indication 3, while the sample containing 0.5 percent by weight of silver glass and 0.05 percent by weight of cupric oxide also generated staphylococcus aureus and colon bacillus and its fungal thread growth corresponded to Indication 1. On the other hand, the sample containing 1.0 percent by weight of silver glass and 0.10 percent by weight of cupric oxide exhibited antibacterial property and its fungal thread growth corresponded to Indication 0. Similarly with respect to Example 35, the samples containing 0.1 percent by weight of silver glass and 0.01 percent by weight of cupric oxide achieved antibacterial property and their fungal thread growth corresponded to Indication 0. This indicates that by blending 0.1 percent by weight of silver glass and 0.01 percent by weight of cupric oxide into glass-containing molding pellets, silver glass and cupric oxide effectuate their antibacterial action efficiently. In other words, the samples in Example 35 containing 0.1 percent by weight of silver glass and 0.01 percent by weight of cupric oxide effectuate the same level of antibacterial/antifungal action at the blending ratios of one-tenth those of the sample in Comparative Example 35 containing 1.0 percent by weight of silver glass and 0.10 percent by weight of cupric oxide.

From the above test results, the samples in Example 35 (containing 0.1 percent by weight of silver glass and 0.01 percent by weight of cupric oxide) effectuate the same level of antibacterial/antifungal action as the sample in Comparative Example 35 (containing 1.0 percent by weight of silver glass and 0.10 percent by weight of cupric oxide). The fact that the samples in Example 35 effectuate the same level of antibacterial/antifungal action as the sample in Comparative Example 35 at the weight blending ratios of silver glass and cupric oxide at one-tenth those of the sample in Comparative Example 35 proves that, while a skin layer is believed to prevent silver ions and copper ions of antibacterial/antifungal agents from bleeding out to the surface of 100% resin molded product, a molded product containing spherical glass by 40 percent by weight or 50 percent by weight has no skin layer formed on it and therefore spherical glass, silver glass and cupric oxide are present on its surface and consequently silver ions and copper ions of antibacterial/antifungal agents can bleed out to the surface.

3. Flame Retardant (Example of Flame Retardant)

In Example 40, spherical glass, PP and a flame retardant were blended. For the flame retardant, antimony trioxide was used. In Example 40, a total of four levels of samples were prepared by adjusting the blending ratio of spherical glass, PP and antimony trioxide to 40:56:4, 40:54:6, 50:46:4 and 50:44:6, respectively.

(Comparative Example of Flame Retardant)

In Comparative Example 40, PP was blended with spherical glass but not with antimony trioxide in some samples, while PP was blended with antimony trioxide but not with spherical glass in others. For samples in Comparative Example 40 where PP was blended with spherical glass but not with antimony trioxide, the weight blending ratio of spherical glass and PP was adjusted to 40:60 and 50:50, respectively. For samples where PP was blended with antimony trioxide but not with spherical glass, the weight blending ratio of resin and antimony trioxide was adjusted to 100:0, 80:20 and 70:30, respectively. In total, samples of five levels were prepared under Comparative Example 40.

The above blending ratios of solid spherical glass, PP and the flame retardant under Example 40 and Comparative Example 40 are shown in Table 7.

TABLE 7

|  | Example 40 (% by weight) | | Comparative Example 40 (% by weight) | | |
|---|---|---|---|---|---|
| Spherical glass | 40 | 50 | 40 | 50 | 0 |
| PP | 56, 54 | 46, 44 | 60 | 50 | 100, 80, 70 |
| Antimony trioxide | 4, 6 | 4, 6 | 0 | 0 | 0, 20, 30 |

(Injection Molded Products)

100% resin pellets or pellets with a glass blending ratio of 40 percent by weight or 50 percent by weight, blended with the flame retardant, were introduced from the hopper of the injection molding machine, and a sheet of 8×6 cm in size and 1.5 mm in thickness was formed under the conditions of 220° C. being the temperature of the pellet introduction part of the aforementioned injection molding machine, 220° C. being the screw center temperature, 235° C. being the temperature of the extrusion part, and 55 kg/m² of pressure.

(Flame Resistance Test)

The flame resistance test was conducted based on U.S. UL 94. Flame resistance levels are classified into V-0>V-1>V-2>HB, decreasing in this order, where V-0 and V-1 represents levels of self extinguishment at which spreading of fire can be prevented at the very minimum. The measured results are shown in Table 8.

Table 8 shows the flame resistance test results of Example 40 and Comparative Example 40.

The first column of Table 8 shows glass blending ratios, with the samples in Example 40 with glass blending ratios of 40 percent by weight and 50 percent by weight shown on top, followed by the samples in Comparative Example 40. The second column shows blending ratios of flame retardant relative to the weight of PP, indicating the blending ratios of antimony trioxide in Example 40 and Comparative Example 40 above.

TABLE 8

|  | Antimony trioxide (% by weight) | Evaluation |
|---|---|---|
| Example 40 (blending ratio 40% by weight) | 4 | V-1 |
|  | 6 | V-0 |
| Example 40 (blending ratio 50% by weight) | 4 | V-1 |
|  | 6 | V-0 |

TABLE 8-continued

|  | Antimony trioxide (% by weight) | Evaluation |
|---|---|---|
| Comparative Example 40 | | |
| (blending ratio 40) | 0.0 | V-2 |
| (blending ratio 50) | 0.0 | V-2 |
| Comparative Example 40 | 0.0 | HB |
| (blending ratio 40) | | |
| (100% resin) | 20 | V-1 |
| (100% resin) | 30 | V-0 |

Table 8 above shows that, with respect to Comparative Example 40, the samples made of 100% PP and resins with glass blending ratios of 40 percent by weight and 50 percent by weight, all of which were free of antimony trioxide, received an evaluation of V-2, while the sample containing 20 percent of antimony trioxide and another containing 30 percent of antimony trioxide received evaluations of V-1 and V-0, respectively. With respect to Example 40, the samples containing 4 percent by weight of antimony trioxide, made of resins with glass blending ratios of 40 and 50 percent by weight, received an evaluation of V-1, while the samples containing 6 percent by weight of antimony trioxide, made of resins with glass blending ratios of 40 and 50 percent by weight, received an evaluation of V-0. This shows that by blending at least 4 percent by weight of antimony trioxide into glass-containing molding pellets, the flame retarding action of antimony trioxide can be effectuated efficiently. To be specific, the samples in Example 40 containing 6 percent by weight of antimony trioxide exhibit equally sufficient flame retarding action at one-fifth the amount of antimony trioxide blended into the aforementioned sample in Comparative Example 40 containing 30 percent by weight of antimony trioxide.

From the above test results, the samples in Example 40 (containing 6 percent by weight of antimony trioxide) effectuate the same level of flame retarding action as the sample in Comparative Example 40 (containing 20 percent by weight of antimony trioxide). These figures are proof that, while the sample in Comparative Example 40 cannot effectuate sufficient flame retarding action because antimony trioxide is covered by the skin layer, the samples in Example 40 effectuate the same level of flame retarding action as the sample in Comparative Example 40, despite containing only one-fifth the amount of antimony trioxide contained in the sample in Comparative Example 40, because the flame retardant are present on the surface of the molded products under Example 40.

The aforementioned test of each injection molded product for antibacterial property due to antibacterial agent and flame resistance due to flame retardant produced results showing that the antibacterial agent and flame retardant were demonstrating their antibacterial action and flame retarding action sufficiently, which proves the presence of such antibacterial agent and flame retardant at the surface of the molded product on which no skin layer is formed.

4. Antistatic Agent (Example of Antistatic Agent)

In Example 50, spherical glass, PET and an antistatic agent were blended. For the antistatic agent, carbon black (manufactured by Mitsubishi Chemical) was used. For Example 50, two levels of samples were prepared by adjusting the weight blending ratio of spherical glass, PET and carbon black to 40:58:2.0 and 50:48.2.0, respectively.

(Comparative Example of Antistatic Agent)

In Comparative Example 50, PET was blended with spherical glass but not with carbon black in some samples, while PET was blended with carbon black but not with spherical glass in others. For samples in Comparative Example 50 where PET was blended with spherical glass but not with carbon black, the weight blending ratio of PET and spherical glass was adjusted to 40:60 and 50:50, respectively. For samples where PET was blended with carbon black but not with spherical glass, the weight blending ratio of resin and carbon black was adjusted to 100:0, 90:10 and 80:20, respectively. In total, samples of five levels were prepared under Comparative Example 50.

The above blending ratios of solid spherical glass, PET and carbon black under Example 50 and Comparative Example 50 are shown in Table 9. The particle size of the aforementioned carbon black was 10 μm.

TABLE 9

|  | Example 50 | | Comparative Example 50 | | |
|---|---|---|---|---|---|
| Spherical glass | 40 | 50 | 40 | 50 | 0 |
| PET | 58 | 48 | 60 | 50 | 100, 90, 80 |
| Carbon black | 2.0 | 2.0 | 0.0 | 0.0 | 0.0, 10, 20 |

(Injection Molded Products)

100% resin pellets or pellets with a glass blending ratio of 40 percent by weight or 50 percent by weight were introduced from the hopper of the injection molding machine, along with an agent-to-be-filled (except for the samples with glass blending ratios of 40 and 50 percent by weight under the Comparative Example), and a sheet of 10×10 cm in size and 4 mm in thickness was formed under the conditions of 240° C. being the temperature of the pellet introduction part of the aforementioned injection molding machine, 250° C. being the screw center temperature, 255° C. being the temperature of the extrusion part, and 55 kg/m² of pressure.

(Surface Resistivity)

Surface resistivity was measured according to the ring electrode method per JIS K 6911 using the high surface resistivity meter MCP-HT260 (manufactured by DIA Instruments) by setting the applied voltage to 500 V and charge time to 1 minute. The results are shown in Table 10.

Table 10 shows the measured results of surface resistivity under Example 50 and Comparative Example 50.

The second column of Table 10 shows the blending ratios of the antistatic agent relative to the weight of PET, or specifically the blending ratios of carbon black in Example 50 and Comparative Example 50 above.

TABLE 10

|  | Carbon black (% by weight) | Surface resistivity (Ω) |
|---|---|---|
| Example 50 (blending ratio 40% by weight) | 2.0 | $4 * 10^6$ |
| Example 50 (blending ratio 50% by weight) | 2.0 | $2 * 10^5$ |
| Comparative Example 50 (blending ratio 40) | 0.0 | $8 * 10^7$ |
| (blending ratio 50) | 0.0 | $5 * 10^7$ |
| Comparative Example 50 | 0.0 | $5 * 10^7$ or above |
| (100% resin) | 10.0 | $5 * 10^6$ |
| (100% resin) | 20.0 | $5 * 10^5$ |

In Comparative Example 50, the samples with glass blending ratios of 40 percent by weight and 50 percent by weight, both of which did not contain carbon black, showed surface resistivities in the order of $10^7$, while the PET 100% sample showed a surface resistivity of $5\times10^7$ or above. With the samples not containing spherical glass, one containing 10 percent by weight of carbon black had a surface resistivity of $5\times10^6$, while the other containing 20 percent by weight of carbon black had a surface resistivity of $5\times10^5$. With respect to Example 50, on the other hand, the sample containing 2.0 percent by weight of carbon black and 40 percent by weight of glass had a surface resistivity in the order of $10^6$, while the one containing 2.0 percent by weight of carbon black and 50 percent by weight of glass had a surface resistivity in the order of $10^5$. These results clearly indicate that when 2.0 percent by weight of carbon black is blended into glass-containing molding pellets, carbon black effectuates its antistatic action efficiently. To be specific, the samples in Example 50 containing 2.0 percent by weight of carbon black effectuate antistatic action similar to what is exhibited by the samples in Comparative Example 50 containing 10 or 20 percent by weight of carbon black.

From the above test results, the samples in Example 50 (containing 2.0 percent by weight of carbon black) effectuate antistatic action similar to the samples in Comparative Example 50 (containing 10 or 20 percent by weight of carbon black). These figures are proof that, while the samples in Comparative Example 50 cannot effectuate sufficient antistatic action because carbon black is covered by the skin layer, the samples in Example 50 effectuate greater antistatic action than those in Comparative Example 50, despite containing only one-fifth and one-tenth the amount of carbon black contained in the samples of Comparative Example 50, because no skin layer is formed on the surface of the molded product and therefore carbon black is present on the surface.

The aforementioned tests of respective injection molded products for antibacterial property, antibacterial/antifungal property, flame retarding property and antistatic property produced results indicating that the antibacterial agent, antibacterial/antifungal agents, flame retardant and antistatic agent effectuated their inherent actions sufficiently, and these results are a clear reflection of presence of antibacterial agent, antibacterial/antifungal agent, flame retardant and antistatic agent on the surface of the molded products due to non-formation of skin layer.

Accordingly, the mechanism behind this non-formation of skin layer on the agent-to-be-filled/glass-containing resin molded product is examined below.

As mentioned above, the section photograph of an injection molded product in FIG. 7 and Raman intensity ratio graphs E and F in FIG. 9 show that as long as the glass blending ratio is 40 percent by weight or more, no skin layer is formed on the surface of glass-containing resin molded product and spherical glass is present on the surface. From this, the cause of non-formation of skin layer on the surface of molded product is presumed as presence, at this surface, of E glass constituting the aforementioned spherical glass having a thermal conductivity of 1.5, and the mechanism is examined accordingly, using PP, for example, by assuming that this glass is present on the surface of the molded product. It should be noted that the thermal conductivity of 100% PP injection molded product is 0.204 W/m·k, which is as low as approx. one-tenth the thermal conductivity of spherical glass.

First, the mechanism behind non-formation of skin layer on an agent-to-be-filled-free PP resin with a glass blending ratio of 60 percent by weight is examined below.

Figure 12:
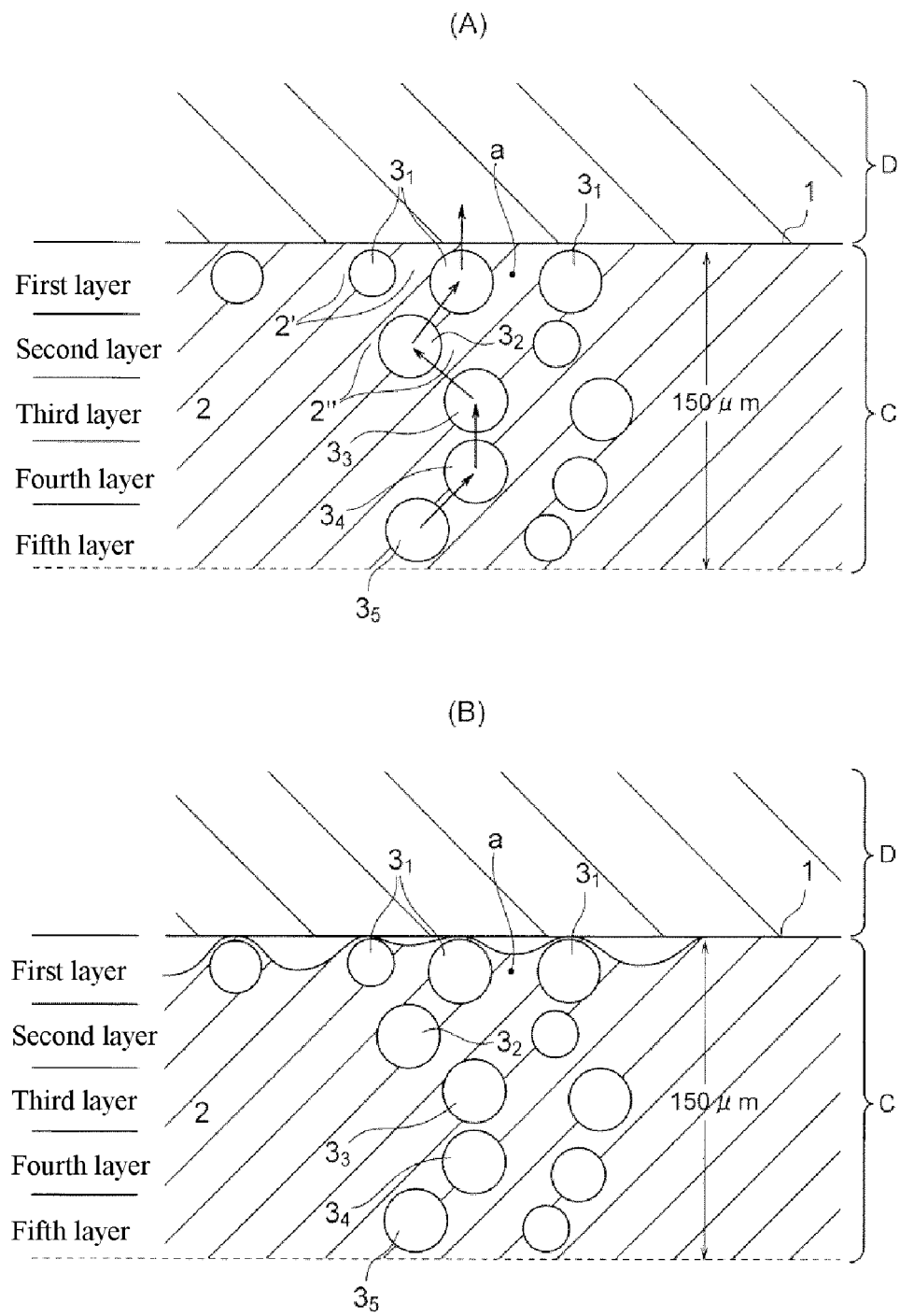
[FIG. 12] A schematic section view showing the conditions of molten PP resin with a glass blending ratio of 60 percent by weight when it was just introduced into the cavity and is contacting the die surface and after the resin has cooled.

FIG. 12 consists of schematic section views showing the condition of molten PP resin with a glass blending ratio of 60 percent by weight contacting the die surface after the resin was introduced into the cavity, and the condition after the resin has been cooled. FIG. 12A is a schematic view showing the condition of this resin contacting the die surface. The mechanism of why no skin layer is formed on the surface of the aforementioned PP resin with a glass blending ratio of 60 percent by weight, being in contact with the die surface, is examined by referring to FIG. 12A.

Symbol C indicates the die cavity, symbol D indicates the die, and numeral 1 indicates the die surface. When molten 100% PP resin of 240° C. is introduced into the cavity (C), the heat of this 240° C. molten PP resin tries to transfer to the outside through the die surface (1) whose temperature is 80° C., but as the 240° C. molten PP resin quickly contacts the die surface (1) of 80° C., it is immediately cooled and solidifies, and a skin layer is formed as a result. Heat of molten resin in the inner part of this skin layer tries to transfer to the die via the skin layer, but probably because the thermal conductivity of PP resin is 0.204 (W/m·K), the molten resin flowing on the inner side of the skin layer inside the cavity causes a shear layer to be formed on the inner side of the skin layer due to the shear force acting between the skin layer and fluid resin.

This is likely explained by the slow transfer of heat from molten resin at the die surface (1) when molten 100% PP resin contacts the die, which probably causes a crystalline skin layer to form on the surface of the first layer, followed by formation of a shear layer on the inner side of the skin layer due to the shear force, resulting in a hardened skin layer. The skin layer thus generated corresponds to the peak in the graph shown in FIG. 9A.

Next, the reason no skin layer is formed on PP resin (2) with a glass blending ratio of 60 percent by weight is examined by assuming that the distributed glass spheres present over a range of 0 to at least 150 μm from the surface of the molded product constitute five layers, in order to facilitate the examination. These glass spheres are assumed to constitute five layers because, as explained earlier, glass spheres of 10 to 40 μm in average particle size are distributed in PP resin in an independently and uniformly dispersed manner, which means that if the average particle size is assumed to be 30 μm, the entire spherical glass area can be viewed as being constituted by five layers. For this reason, the distance of 0 to approx. 30 μm from the surface is defined as the first layer, distance from approx. 30 to 60 μm as the second layer, distance from approx. 60 to 90 μm as the third layer, distance from approx. 90 to 120 μm as the fourth layer, and distance from approx. 120 to 150 μm as the fifth layer.

When molten PP resin (2) of 240° C. having a glass blending ratio of 60 percent by weight is introduced into the cavity (C), glass spheres $(3_1)$ having a thermal conductivity of 1.5 which are present on the surface of the aforementioned first layer spanning approx. 30 μm come in contact with the die surface (1) of the die (D) via molten resin of several μm thick, and therefore heat of these 240° C. glass spheres $(3_1)$ quickly transfers toward the die whose temperature is 80° C. At the same time, since the spherical shape of glass $(3_1)$ means that its surface area is the largest, heat of the surrounding 240° C. resin (2') contacting these glass spheres $(3_1)$ also transfers quickly toward the 80° C. die (D) via the glass. For example, heat of 240° C. at point "a," as shown in FIG. 12A, probably transfers to the resin on the left side and then escapes to the die via the glass $(3_1)$, without transferring to the resin above point "a." While the thermal conductivity of 100% PP resin is 0.204, that of the spherical glass $(3_1)$ is 1.5, or 7.4 times higher, and therefore heat of the aforementioned surrounding resin (2') transfers to the die (D) via the spherical glass $(3_1)$ having a thermal conductivity of 1.5.

Next, heat of the 240° C. spherical glass $(3_2)$ constituting the second layer transfers toward the spherical glass $(3_1)$ and then toward the die via the aforementioned surrounding resin (2') the moment the heat from this resin (2') transfers to the spherical glass ($3_1$), and heat of the surrounding 240° C. resin (2") contacting this glass ($3_2$) also transfers toward the spherical glass ($3_1$) via the glass ($3_2$) and then toward the die. Similarly, heat of the 240° C. spherical glass constituting the third layer, fourth layer and fifth layer respectively transfers toward the die via the spherical glass constituting the preceding layer.

This is probably explained by the fact that when the molten PP resin with a glass blending ratio of 60 percent by weight contacts the die via molten resin of several μm in thickness, heat of the first layer quickly transfers toward the die because the thermal conductivity of spherical glass is 7.4 times higher than that of molten 100% PP resin, which explains why no skin layer is formed on the surface of the first layer, and because no skin layer is formed, no shear layer is formed, either. Subsequently, heat quickly transfers from the spherical glass ($3_2$) constituting the second layer to the spherical glass ($3_1$) constituting the first layer, as well as from the spherical glass ($3_3$) constituting the third layer to the spherical glass ($3_2$) constituting the second layer and then to the spherical glass ($3_1$) constituting the first layer. The transfer of heat to/from the fourth and fifth layers is also the same and therefore not explained.

As explained above, heat of 240° C. in the first layer transfers toward the die via spherical glass ($3_1$) having a thermal conductivity of 1.5, after which heat of 240° C. in the second layer transfers toward the die via spherical glass ($3_2$), and then heat of 240° C. in the third, fourth and fifth layers transfers toward the die in the same manner via spherical glass ($3_3$), spherical glass ($3_4$) and spherical glass ($3_5$), respectively, and this way heat of 240° C. in each layer quickly transfers to the die through the paths indicated by arrows in FIG. 12A. It is considered that the aforementioned mechanism of heat conduction via spherical glass prevents skin layer from being formed on the molten PP resin with a glass blending ratio of 60 percent by weight.

To summarize the foregoing, the mechanism of why no skin layer is formed when molten PP resin with a glass blending ratio of 40 to 70 percent by weight contacts the die surface was revealed as the quick transmission of 240° C. heat by a number of glass spheres present over a range of 0 to at least 150 μm from the surface of the molded product, which in turn is explained by blending of spherical glass made of E glass whose thermal conductivity is 1.50, into PP resin at a ratio of 40 percent by weight or more.

FIG. 12B is a schematic section view showing the condition after cooling, created by examining the front side structures illustrated in FIGS. 5 and 6 and graphs of Raman intensity ratios given by FIGS. 9 and 11. As explained above, the front side structures in FIGS. 5 and 6 indicate a characteristic shape on the front side of an injection molded product, where a number of convex shapes are distributed. These convex shapes are formed in a large number according to the thickness or thinness of resin covering glass spheres as measured from the die surface to the position where glass spheres are present, as well as far or near distance of the horizontally oriented glass spheres present beneath this resin, where these four conditions are likely interacting with one another to form the aforementioned convex shapes in a probabilistic manner. For example, if glass spheres are thinly covered with resin and glass spheres are far away from one another, convex shapes are likely formed at a high probability. If glass spheres are thinly covered and glass spheres are close to one another, on the other hand, convex shapes are likely formed adjacent to one another at a high probability.

Molten resin shrinks when cooled. For example, when glass spheres are thinly covered with resin and glass spheres are far away from one another, as illustrated by the spherical glass on the far left in FIG. 12B, there is less resin between the die surface and spherical glass, and more resin is present between glass spheres, and therefore the resin between glass spheres shrinks and convex shapes are formed in a manner covering glass spheres. When glass spheres are thinly covered and glass spheres are close to one another, as illustrated by the three glass spheres at the center in FIG. 12B, on the other hand, there is less resin between the die surface and glass spheres and the amount of resin between glass spheres is also small, and consequently the resin between glass spheres shrinks less than in the aforementioned example and thus convex shapes are formed adjacent to each other in a manner covering glass spheres.

In any case, the front side structure of a glass-containing resin molded product is such that a skin layer is formed in a range of 0 to 150 μm from the surface when the molded product is made of 100% resin, and if it is assumed that the many glass spheres present in this range are formed according to the four conditions of thickness or thinness of resin covering glass spheres as well as far or near distance of the horizontally oriented glass spheres underneath, then many convex shapes are formed in a distributed manner on the surface of a glass-containing resin molded product if its glass spheres are thinly covered with resin. This assumption explains the mechanism of why convex shapes as shown in the electron micrographs in FIGS. 5 and 6 are formed.

The aforementioned mechanism whereby blending, into PP resin, spherical glass made of E glass having a thermal conductivity of 1.50 at a glass blending ratio of 40 percent by weight or more would allow a number of spherical glass particles present on the surface of the molded product over a range of 0 to at least 150 μm from the surface to quickly transfer heat of 240° C., is likely working as well when a trace amount of agent-to-be-filled is blended into PP resin containing glass by 60 percent by weight, and therefore it is obvious that the agent-to-be-filled is present on the surface of the resin molded product and accordingly, the mechanism at work when spherical glass and agent-to-be-filled are blended into PP resin containing glass by 60 percent by weight is not explained here.

With regard to Patent Literatures 7 and 8 in "Prior Art," the statement "Non-patent Literature 3 indicates that a skin layer exists over a thickness of 100 to 200 μm from the surface, which means that separating or roughening the surface of molded product only permits action of antibacterial agent present in the skin layer over a thickness of 0 to several microns, and antibacterial agent present deeper than several microns cannot effectively effectuates its bacterial elimination action" (refer to Paragraph 17) does not explain the basis of why the antibacterial action of antibacterial agent present deeper than several microns does not work effectively, and therefore this basis is explained. The reason the basis for the above is explained is that by explaining the condition in which the agent-to-be-filled is distributed over a range of 0 to 150 μm where a skin layer is formed on a 100% resin molded product, the technical significance of the presence of the agent-to-be-filled on the surface of the agent-to-be-filled/glass-containing resin molded product proposed by the present invention becomes clear.

FIG. 12 is a schematic diagram showing the condition of molten PP resin containing glass by 60 percent by weight when molten resin has just been poured into the cavity and is contacting the die surface, as well as the condition after it has been cooled. This schematic diagram is used as a reference to explain the distribution condition of an agent-to-be-filled that has been blended into a 100% resin molded product. Although not illustrated, assume that, for example, silver zeolite is used as an antibacterial agent and is blended by 0.1 percent by weight relative to the total weight, in which case when molten PP resin is poured into the cavity (C) and contacts the wall surface in the cavity (C), it immediately cools and solidify, and at the same time silver zeolite present over a range of 0 to several μm from the surface of the first layer crystallizes instantly and solidifies, while silver zeolite present deeper than several μm in the first layer moves toward the inner areas where flowability is higher. Here, molten resin flowing inward in the solidified skin layer receives a shear force acting between the solidified skin layer and molten resin and consequently silver zeolite moves further inward. As a result, silver zeolite present deeper than several μm in the first layer moves to the second layer and then to the third layer, and eventually many silver zeolite particles that were initially present at depths of several μm in the first layer to the second layer will likely move toward the third layer. Accordingly, although silver zeolite that was present over a range of 0 to μm from the surface of the first layer and which crystallized instantly and solidified could have effectuated antibacterial action, the probability of silver zeolite distributed over depths of several μm in the first layer to the second layer and third layer is now lower, and therefore antibacterial action cannot be effectuated.

It should be noted that in the section describing the relationships of resin type, film thickness and moisture permeability, it was described that sufficient antibacterial action can be effectuated even though the silver antibacterial agent is covered with a film of no more than several μm in thickness. As mentioned above, however, in the case of molded products constituted by blending an agent-to-be-filled into a 100% resin the probability of silver antibacterial agent distributed over depths of several μm in the first layer to the second layer and third layer is now lower, and therefore even when a rough surface is formed by the method of roughening the skin layer surface as described in Patent Literature 8, for example, it is only effective to roughen the film of antibacterial agent present within a band of several μm that have been crystallized due to contact with the die surface, and the bleed-out of a trace amount of silver antibacterial agent present in the second layer and third layer does not result in effective antibacterial action. This is the meaning of the aforementioned claim "antibacterial agent present deeper than several microns cannot effectively effectuate its bacterial elimination action."

As explained above, blending a silver antibacterial agent into a 100% resin results in a lower probability of the antibacterial agent distributed over depths of several μm in the first layer to the second layer and third layer and therefore its antibacterial action cannot be effectuated; on the other hand, however, blending glass into resin at a ratio of 40 percent by weight or more prevents skin layer from forming and thus allows an added agent-to-be-filled to exist over a range of 0 to at least 150 μm from the surface of molded product, and consequently silver ions of the silver antibacterial agent present not only in the first layer but also in the second layer and third layer bleed out and effectuate their antibacterial action.

Furthermore, blending 1.0 percent by weight of silver zeolite with 99.0 percent by weight of Ny in Comparative Example 30 above means blending 1.0 percent by weight of silver zeolite into a 100% Ny resin containing no spherical glass. In comparison, blending 0.1 percent by weight of silver zeolite into Ny containing glass by 50 percent by weight in Example 30 above indicates that, since 50 percent by weight of spherical glass is already contained, blending 0.1 percent by weight of silver zeolite with 49.90 percent by weight of Ny results in an agent-to-be-filled blending ratio of 0.02 percent by weight to the total weight of the Ny resin and agent-to-be-filled excluding spherical glass. In other words, blending 0.1 percent by weight of silver zeolite into Ny containing glass by 50 percent by weight gives an equivalent blending ratio of 0.02 percent by weight when the content of silver zeolite to 100% Ny resin is considered, and therefore by blending spherical glass by 50 percent by weight, the antibacterial and other actions of an agent-to-be-filled become twice as effective as the blending ratio of the agent-to-be-filled relative to the total weight of the resin and agent-to-be-filled suggests. In the example used here, blending 0.1 percent by weight of silver zeolite into Ny containing glass by 50 percent by weight is virtually the same as blending 0.02 percent by weight of silver zeolite, and the antibacterial action achieved by this silver zeolite blending ratio of 0.02 percent by weight becomes the same as the antibacterial action achieved by blending 1.0 percent by weight of silver zeolite into 100% resin as shown in Comparative Example 30. Clearly the antibacterial and other actions of any agent-to-be-filled added to glass-containing resin molded product increase by an inverse multiple of the blending ratio of the agent-to-be-filled to the total weight of the agent-to-be-filled and resin.

Experimental data is used to prove that sink marks, warping and flow marks are not generated on glass-containing resin molded products because no skin layer is formed on their surface.

(Sink Marks)

Injection molded products with a rib were prepared as comparative example and as examples, including a molded product made of the aforementioned LDPE with a glass blending ratio of 0 percent by weight (Comparative Example 1), as well as molded products with a glass blending ratio of 30 percent by weight (Experimental Example 1), 40 percent by weight (Experimental Example 2) and 60 percent by weight (Experimental Example 3), and sink marks were inspected visually.

The samples in Comparative Example 1 and Experimental Example 1 are both a molded product that constitutes a flat opening/closing lid of 62 mm in length, 82 mm in width and 2.4 mm in thickness, having a rib of 51.2 mm in diameter and 3 mm in height at the center on one side. The aforementioned LDPE was used as the resin to produce pellets with glass blending ratios of 0 percent by weight, 30 percent by weight, 40 percent by weight and 50 percent by weight, and these pellets were used to create injection molded products. The molding conditions were a melting temperature of 240° C., 50 kg/cm$^2$ of pressure and a die temperature of 60° C. The results of visual inspection of the condition of sink marks in the top face of the molded products are shown in Table 11. While the sample in Comparative Example 1 with a glass blending ratio of 0 percent by weight and another in Experimental Example 1 with a glass blending ratio of 30 percent by weight exhibited sink marks, the sample in Experimental Example 2 with a glass blending ratio of 40 percent by weight and another in Experimental Example 3 with a glass blending ratio of 50 percent by weight did not have sink marks.

These visual inspection results agree with the aforementioned results showing that, while a skin layer is formed on the surface of a resin molded product in a range of glass blending ratios of 0 to less than 40 percent by weight, no skin layer is formed in a range of glass blending ratios of 40 to 70 percent by weight. This clearly indicates that non-formation of skin layer on the surface of glass-containing resin molded products with glass blending ratios of 40 to 70 percent by weight, due to the aforementioned spherical glass, is the reason sink marks do not occur.

TABLE 11

|  | Glass blending ratio | Sink marks |
| --- | --- | --- |
| Comparative Example 1 | 0% by weight | Occurred |
| Experimental Example 1 | 30% by weight | Occurred |
| Experimental Example 2 | 40% by weight | Did not occur |
| Experimental Example 3 | 50% by weight | Did not occur |

(Warping)

An example of an experiment where warping of flat sheets was evaluated using PP is explained. Using PP of the same quality used in the sink mark experiment, pellets with a glass blending ratio of 0 percent by weight (Comparative Example 2), 30 percent by weight (Experimental Example 4), 40 percent by weight (Experimental Example 5) and 50 percent by weight (Experimental Example 6) were created. The molding conditions were the same as those in the sink mark experiment. All molded products were shaped as a flat sheet of 50 mm in length, 100 mm in width and 3 mm in thickness.

Table 12 shows the results of measuring the amount of warping on both sides of the flat sheet, from the reference point at the center of the flat sheet, using a microscope.

While the sample in Comparative Example 2 with a glass blending ratio of 0 percent by weight and another in Experimental Example 4 with a glass blending ratio of 30 percent by weight showed warping, the sample in Experimental Example 5 with a glass blending ratio of 40 percent by weight and another in Experimental Example 6 with a glass blending ratio of 50 percent by weight did not have warping. This clearly indicates that non-formation of skin layer, or nonappearance of skin layer, at glass blending ratios of 40 to 70 percent by weight is the reason warping does not occur.

TABLE 12

|  | Glass blending ratio | Amount of warping (mm) |
| --- | --- | --- |
| Comparative Example 2 | 0% by weight | 1.3 |
| Experimental Example 4 | 30% by weight | 0.7 |
| Experimental Example 5 | 40% by weight | 0.0 |
| Experimental Example 6 | 50% by weight | 0.0 |

(Flow Marks)

An example of an experiment where flow marks were evaluated using PP is explained. Using PP of the same quality used in the sink mark experiment, pellets with a glass blending ratio of 0 percent by weight (Comparative Example 3) and 50 percent by weight (Experimental Example 7) were created. The injection molding conditions were the same as those in the sink mark experiment. All molded products were shaped as a soup bowl of 11 cm in outer diameter, 7 cm in height and 3 mm in thickness. Table 13 shows the evaluation results of flow marks on these soup bowls.

The sample in Comparative Example 3 with a glass blending ratio of 0 percent by weight generated flow marks of a stripe pattern on the inside of the soup bowl. On the other hand, the sample in Experimental Example 7 with a glass blending ratio of 50 percent by weight generated no flow mark at all. This clearly indicates that non-formation of skin layer, or nonappearance of skin layer, at glass blending ratios of 40 to 70 percent by weight is the reason flow marks are not generated.

TABLE 13

|  | Glass blending ratio | Flow marks |
| --- | --- | --- |
| Comparative Example 3 | 0% by weight | Occurred |
| Experimental Example 7 | 50% by weight | Did not occur |

Note that while the examples used spherical glass made of E glass, use of silica glass is limited to types whose thermal conductivity is close to that of E glass, or 1.5. Even if silica glass is used to produce spherical glass, therefore, it is clear that no skin layer will form on the resin covering the silica glass as long as the silica glass is blended by at least 40 percent by weight in the resin.

The aforementioned glass-containing resin molded products can be used for various applications such as cosmetic containers, cosmetic implements, chemical containers, food containers, tableware, trays, tiles, bathtubs, kitchen/bath products, toiletry, automobile parts, electronic parts or construction materials.

The invention claimed is:

1. A glass-containing resin molded product containing an active ingredient, formed by molding, using dies, a glass-containing resin composition produced by meltkneading pellets of thermoplastic resin, solid, spherical glass particles, and the active ingredient, said active ingredient selected from the group consisting of an antibacterial agent, antifungal agent, flame retardant and antistatic agent, wherein the solid, spherical glass particles have an average particle size of 10 to 40 μm and are contained in the glass-containing resin molded product at a glass blending ratio of 40 to 70 percent by weight, said thermoplastic resin selected from the group consisting of polypropylene resin, polypropylene resin, polyethylene terephthalate resin and polyamide resin, and a skin layer having a molecular orientation different from that of a layer thereunder is not formed on the surface layer of said glass-containing resin molded product, and the solid, spherical glass particles as well as the active ingredient are present on the surface where no skin layer is formed.

2. A glass-containing resin molded product according to claim 1, characterized in that an equivalent action of the active ingredient can be effectuated even when the total weight of the active ingredient blended in said glass-containing molded product is at least one-fifth the total weight of the active ingredient blended in a 100% resin.

3. A glass-containing resin molded product according to claim 1, characterized in that the spherical glass is made of E glass or silica glass.

4. A glass-containing resin molded product according to claim 1, characterized in that the front side of said glass-containing resin molded product has a number of distributed convex shapes.

5. A glass-containing resin molded product according to claim 3, characterized in that the molding is implemented in the form of injection molding, blow molding or profile extrusion molding.

6. A glass-containing resin molded product according to claim 1, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

7. A glass-containing resin molded product containing ingredient, formed by molding, using dies, a glass-containing resin composition produced by meltkneading pellets of thermoplastic resin, solid, spherical glass particles, and the active ingredient said active ingredient selected from the group consisting of an antibacterial agent, antifungal agent, flame retardant and antistatic agent, wherein the solid, spherical glass particles have an average particle size of 10 to 40 μm and are contained in the glass-containing resin molded product at a glass blending ratio of 40 to 70 percent by weight, said thermoplastic resin selected from the group consisting of polypropylene resin, polypropylene resin, polyethylene terephthalate resin and polyamide resin, and the solid, spherical glass particles as well as the active ingredient are present in a layer at the surface of said glass-containing resin molded product where a skin layer having a molecular orientation different from that of a layer thereunder is not formed, and its front side has a number of distributed convex shapes.

8. A glass-containing resin molded product according to claim 7, characterized in that an equivalent action of the active ingredient can be effectuated even when the total weight of the active ingredient blended in said glass-containing molded product is at least one-fifth the total weight of the active ingredient blended in a 100% resin.

9. A glass-containing resin molded product according to claim 7, characterized in that no sink marks, warping and flow marks generate on the front side of said glass-containing resin molded product.

10. A glass-containing resin molded product according to claim 7, characterized in that the molding is implemented in the form of injection molding, blow molding or profile extrusion molding.

11. A glass-containing resin molded product according to claim 7, characterized in that said glass-containing resin molded product is used for cosmetic containers, cosmetic implements, chemical containers, food containers, tableware, trays, tiles, bathtubs, kitchen/bath products, toiletry, automobile parts, electronic parts or construction materials.

\* \* \* \* \*

UNITED STATES PATENT AND TRADEMARK OFFICE
CERTIFICATE OF CORRECTION

| | | |
|---|---|---|
| PATENT NO. | : 8,344,044 B2 | Page 1 of 1 |
| APPLICATION NO. | : 13/001026 | |
| DATED | : January 1, 2013 | |
| INVENTOR(S) | : Nakamura | |

It is certified that error appears in the above-identified patent and that said Letters Patent is hereby corrected as shown below:

On the title page in column 2 (item 56) at line 17, Under Other Publications, change "(Englishi" to --(English--.

In the Drawings

Sheet 1 of 7 (Y-axis, FIG. 1) at line 1, Change " Frequency " to --Frequency--.

In the Specification

In column 14 at line 21, After "glass" delete "spheresglass".

In the Claims

In column 36 at lines 33-34, In Claim 1, change "of polypropylene" to --of polyethylene--.
In column 36 at line 66, In Claim 7, before "ingredient," insert --an active--.
In column 37 at line 2, In Claim 7, change "ingredient said" to --ingredient, said--.
In column 37 at lines 9-10, In Claim 7, change "of polypropylene" to --of polyethylene--.

Signed and Sealed this
Twenty-fourth Day of September, 2013

Teresa Stanek Rea
*Deputy Director of the United States Patent and Trademark Office*